United States Patent
Naware et al.

(10) Patent No.: US 11,270,373 B2
(45) Date of Patent: Mar. 8, 2022

(54) METHOD SYSTEM AND MEDIUM FOR GENERATING VIRTUAL CONTEXTS FROM THREE DIMENSIONAL MODELS

(71) Applicant: eBay Inc., San Jose, CA (US)

(72) Inventors: Mihir Naware, Redwood City, CA (US); Jatin Chhugani, Santa Clara, CA (US); Jonathan Su, San Jose, CA (US)

(73) Assignee: eBay Inc., San Jose, CA (US)

( * ) Notice: Subject to any disclaimer, the term of this patent is extended or adjusted under 35 U.S.C. 154(b) by 189 days.

(21) Appl. No.: 16/591,973

(22) Filed: Oct. 3, 2019

(65) Prior Publication Data

US 2020/0034918 A1   Jan. 30, 2020

Related U.S. Application Data

(63) Continuation of application No. 14/581,351, filed on Dec. 23, 2014, now Pat. No. 10,475,113.

(51) Int. Cl.
*G06F 3/048* (2013.01)
*G06Q 30/06* (2012.01)
(Continued)

(52) U.S. Cl.
CPC ......... *G06Q 30/0643* (2013.01); *G06F 30/23* (2020.01); *G06T 13/40* (2013.01); *G06F 2113/12* (2020.01)

(58) Field of Classification Search
CPC .................................................. G06F 3/0482
See application file for complete search history.

(56) References Cited

U.S. PATENT DOCUMENTS

| 5,255,352 A | 10/1993 | Falk |
| 5,495,568 A | 2/1996 | Beavin |

(Continued)

FOREIGN PATENT DOCUMENTS

| CN | 1787003 A | 6/2006 |
| CN | 101937078 A | 1/2011 |

(Continued)

OTHER PUBLICATIONS

Joshes19 "The Sims 4—Tutorial: Building A Starter House" https://www.youtube.com/watch?v=OTKipK6UvSs, pertinent timestamps 7:15-7:30 minutes; herein referred to as "The Sims 4". Sep. 8, 2014 (Year: 2014).*

(Continued)

*Primary Examiner* — Nicholas Augustine
(74) *Attorney, Agent, or Firm* — FIG. 1 Patents

(57) ABSTRACT

Techniques for generated and presenting images of items within user selected context images are presented herein. In an example embodiment, an access module can be configured to receive a first environment model and a first wearable item model. A simulation module coupled to the access module may process the environment model to identify placement volumes within the environment model and to place a clothed body model within the placement volume to generate a context model. A rendering module may then generate a context image from the context model. In various embodiments, the environment model used for the context, the wearable item positioned within the environment model, and rendering values used to generate context images may be changed in response to user inputs to generate new context images that are displayed to a user.

20 Claims, 16 Drawing Sheets

(51) Int. Cl.
  *G06T 13/40*  (2011.01)
  *G06F 30/23*  (2020.01)
  *G06F 3/01*   (2006.01)
  *G06F 113/12* (2020.01)

(56) References Cited

U.S. PATENT DOCUMENTS

| | | | |
|---|---|---|---|
| 5,930,769 A | 7/1999 | Rose | |
| 6,175,655 B1 | 1/2001 | Georg et al. | |
| 6,310,627 B1 | 10/2001 | Sakaguchi | |
| 6,415,199 B1 | 7/2002 | Liebermann | |
| 6,546,309 B1 | 4/2003 | Gazzuolo | |
| 6,643,385 B1 | 11/2003 | Bravomalo | |
| 6,813,838 B2 | 11/2004 | McCormick | |
| 7,242,999 B2 | 7/2007 | Wang | |
| 7,308,332 B2 | 12/2007 | Okada et al. | |
| 7,328,119 B1 | 2/2008 | Pryor et al. | |
| 7,354,411 B2 | 4/2008 | Perry et al. | |
| 7,398,133 B2 | 7/2008 | Wannier et al. | |
| 7,548,794 B2 | 6/2009 | Vandergriff et al. | |
| 7,714,912 B2 | 5/2010 | Faisman et al. | |
| 8,090,465 B2 | 1/2012 | Zeng | |
| 8,269,778 B1 | 9/2012 | Baraff et al. | |
| 8,359,247 B2 | 1/2013 | Vock | |
| 8,525,828 B1 | 9/2013 | Bates | |
| 8,659,596 B2 | 2/2014 | Corazza et al. | |
| 8,704,832 B2 | 4/2014 | Taylor et al. | |
| 8,711,175 B2 | 4/2014 | Aarabi | |
| 8,736,606 B2 | 5/2014 | Ramalingam | |
| 8,749,556 B2 | 6/2014 | De Aguiar et al. | |
| 8,797,328 B2 | 8/2014 | Corazza et al. | |
| 8,970,585 B2 | 3/2015 | Weaver | |
| 9,098,873 B2* | 8/2015 | Geisner | G06Q 30/02 |
| 9,205,562 B1* | 12/2015 | Konolige | B25J 9/1687 |
| 9,274,595 B2* | 3/2016 | Reitan | G06F 8/315 |
| 9,292,085 B2* | 3/2016 | Bennett | G06F 3/017 |
| 9,378,593 B2 | 6/2016 | Chhugani et al. | |
| 9,443,352 B1* | 9/2016 | Glover | G06T 19/20 |
| 9,460,342 B1 | 10/2016 | Freund et al. | |
| 9,691,161 B1 | 6/2017 | Yalniz et al. | |
| 9,984,409 B2* | 5/2018 | Naware | G06F 3/04842 |
| 10,235,827 B2* | 3/2019 | Gagner | G07F 17/3206 |
| 10,475,113 B2 | 11/2019 | Naware et al. | |
| 11,100,054 B2 | 8/2021 | Fang et al. | |
| 2001/0026272 A1 | 10/2001 | Feld et al. | |
| 2002/0004763 A1 | 1/2002 | Lam | |
| 2002/0126328 A1 | 9/2002 | Lehmeier et al. | |
| 2002/0174360 A1 | 11/2002 | Ikeda | |
| 2003/0101105 A1 | 5/2003 | Vock | |
| 2003/0139896 A1 | 7/2003 | Dietz et al. | |
| 2004/0049309 A1 | 3/2004 | Gardner et al. | |
| 2004/0083142 A1 | 4/2004 | Kozzinn | |
| 2006/0020482 A1 | 1/2006 | Coulter | |
| 2006/0131401 A1 | 6/2006 | Do et al. | |
| 2006/0202986 A1 | 9/2006 | Okada et al. | |
| 2007/0005174 A1 | 1/2007 | Thomas | |
| 2007/0124215 A1 | 5/2007 | Simmons | |
| 2007/0182736 A1 | 8/2007 | Weaver | |
| 2007/0250203 A1 | 10/2007 | Yamamoto et al. | |
| 2008/0071559 A1 | 3/2008 | Arrasvuori | |
| 2008/0140650 A1 | 6/2008 | Stackpole | |
| 2008/0163344 A1 | 7/2008 | Yang | |
| 2008/0201228 A1 | 8/2008 | Gillet et al. | |
| 2008/0201638 A1 | 8/2008 | Nair | |
| 2008/0221403 A1 | 9/2008 | Fernandez | |
| 2008/0312765 A1 | 12/2008 | Gardiner et al. | |
| 2009/0002224 A1 | 1/2009 | Khatib et al. | |
| 2009/0002394 A1 | 1/2009 | Chen et al. | |
| 2009/0018803 A1 | 1/2009 | Ko et al. | |
| 2009/0115777 A1 | 5/2009 | Reyers Moreno | |
| 2009/0144639 A1 | 6/2009 | Nims et al. | |
| 2009/0172587 A1 | 7/2009 | Carlisle et al. | |
| 2009/0276300 A1 | 11/2009 | Shaw et al. | |
| 2010/0030578 A1 | 2/2010 | Siddique et al. | |
| 2010/0049633 A1 | 2/2010 | Wannier et al. | |
| 2010/0082360 A1 | 4/2010 | Chien et al. | |
| 2010/0097395 A1 | 4/2010 | Chang et al. | |
| 2010/0191770 A1 | 7/2010 | Cho et al. | |
| 2010/0280920 A1 | 11/2010 | Scott et al. | |
| 2010/0305909 A1 | 12/2010 | Wolper et al. | |
| 2010/0306082 A1 | 12/2010 | Wolper et al. | |
| 2010/0313141 A1 | 12/2010 | Yu et al. | |
| 2011/0022372 A1 | 1/2011 | Isogai et al. | |
| 2011/0022965 A1 | 1/2011 | Lawrence et al. | |
| 2011/0063208 A1 | 3/2011 | Van Den et al. | |
| 2011/0184831 A1 | 7/2011 | Dalgleish | |
| 2011/0191070 A1 | 8/2011 | Ramalingam | |
| 2011/0231278 A1 | 9/2011 | Fries | |
| 2011/0234591 A1 | 9/2011 | Mishra et al. | |
| 2011/0292034 A1 | 12/2011 | Corazza et al. | |
| 2011/0298897 A1 | 12/2011 | Sareen et al. | |
| 2012/0030062 A1 | 2/2012 | Stauffer et al. | |
| 2012/0054059 A1 | 3/2012 | Rele | |
| 2012/0078145 A1 | 3/2012 | Malhi et al. | |
| 2012/0095589 A1 | 4/2012 | Vapnik | |
| 2012/0233003 A1 | 9/2012 | Caiman et al. | |
| 2012/0281019 A1 | 11/2012 | Tamstorf et al. | |
| 2012/0299912 A1 | 11/2012 | Kapur et al. | |
| 2012/0308087 A1 | 12/2012 | Chao et al. | |
| 2012/0309520 A1 | 12/2012 | Evertt et al. | |
| 2012/0310791 A1 | 12/2012 | Weerasinghe | |
| 2013/0024301 A1 | 1/2013 | Mikan et al. | |
| 2013/0071584 A1 | 3/2013 | Bell | |
| 2013/0108121 A1 | 5/2013 | De Jong | |
| 2013/0110482 A1 | 5/2013 | Ellens et al. | |
| 2013/0173226 A1 | 7/2013 | Reed et al. | |
| 2013/0215116 A1* | 8/2013 | Siddique | G06Q 20/204 345/420 |
| 2013/0258045 A1 | 10/2013 | Wojciech | |
| 2013/0258117 A1 | 10/2013 | Penov et al. | |
| 2013/0268399 A1 | 10/2013 | Lu et al. | |
| 2013/0317944 A1 | 11/2013 | Huang et al. | |
| 2013/0317950 A1 | 11/2013 | Abraham et al. | |
| 2014/0035913 A1 | 2/2014 | Higgins et al. | |
| 2014/0114620 A1 | 4/2014 | Grinspun et al. | |
| 2014/0114884 A1 | 4/2014 | Daway | |
| 2014/0129390 A1 | 5/2014 | Mauge et al. | |
| 2014/0164902 A1 | 6/2014 | Sager | |
| 2014/0176565 A1 | 6/2014 | Adeyoola et al. | |
| 2014/0180864 A1 | 6/2014 | Orlov et al. | |
| 2014/0257993 A1 | 9/2014 | Paolini | |
| 2014/0267717 A1 | 9/2014 | Pitzer et al. | |
| 2014/0270540 A1 | 9/2014 | Spector et al. | |
| 2014/0279200 A1 | 9/2014 | Hosein et al. | |
| 2014/0279289 A1 | 9/2014 | Steermann | |
| 2014/0313192 A1 | 10/2014 | Corazza et al. | |
| 2014/0333614 A1 | 11/2014 | Black et al. | |
| 2014/0368849 A1 | 12/2014 | Kaur | |
| 2015/0046375 A1* | 2/2015 | Mandel | G06T 13/80 706/11 |
| 2015/0070351 A1* | 3/2015 | Tarquini | G06T 17/20 345/419 |
| 2015/0130795 A1 | 5/2015 | Chhugani et al. | |
| 2015/0134302 A1 | 5/2015 | Chhugani et al. | |
| 2015/0134493 A1 | 5/2015 | Su et al. | |
| 2015/0134494 A1 | 5/2015 | Su et al. | |
| 2015/0134495 A1 | 5/2015 | Naware et al. | |
| 2015/0134496 A1 | 5/2015 | Grinblat et al. | |
| 2015/0154691 A1* | 6/2015 | Curry | G06F 30/23 705/27.2 |
| 2015/0186977 A1 | 7/2015 | Leonard et al. | |
| 2015/0366504 A1 | 12/2015 | Connor | |
| 2016/0035061 A1 | 2/2016 | Gadre et al. | |
| 2016/0063588 A1 | 3/2016 | Gadre et al. | |
| 2016/0088284 A1 | 3/2016 | Sareen et al. | |
| 2016/0092956 A1 | 3/2016 | Su et al. | |
| 2016/0093085 A1* | 3/2016 | Ray | G06T 13/40 345/419 |
| 2016/0117749 A1 | 4/2016 | Desmarais et al. | |
| 2016/0155186 A1 | 6/2016 | Su et al. | |
| 2016/0165988 A1 | 6/2016 | Glasgow et al. | |
| 2016/0165989 A1 | 6/2016 | Glasgow et al. | |
| 2016/0171583 A1 | 6/2016 | Glasgow et al. | |
| 2016/0180447 A1 | 6/2016 | Kamalie et al. | |

(56) References Cited

U.S. PATENT DOCUMENTS

| | | | |
|---|---|---|---|
| 2016/0180449 A1* | 6/2016 | Naware | G06T 13/40 |
| | | | 705/27.2 |
| 2016/0180562 A1 | 6/2016 | Naware et al. | |
| 2016/0210602 A1 | 7/2016 | Siddique et al. | |
| 2016/0247017 A1 | 8/2016 | Sareen et al. | |
| 2016/0249699 A1 | 9/2016 | Inghirami | |
| 2016/0292779 A1 | 10/2016 | Rose et al. | |
| 2016/0292915 A1 | 10/2016 | Chhugani et al. | |
| 2017/0004567 A1 | 1/2017 | Dutt et al. | |
| 2017/0163882 A1 | 6/2017 | Piramuthu et al. | |
| 2017/0243064 A1 | 8/2017 | Simari et al. | |
| 2019/0138834 A1 | 5/2019 | Collet Romea et al. | |
| 2020/0111261 A1 | 4/2020 | Fang et al. | |
| 2021/0064217 A1* | 3/2021 | Mildrew | G06F 3/04815 |
| 2021/0335034 A1* | 10/2021 | Bell | G06T 19/003 |
| 2021/0342306 A1 | 11/2021 | Fang et al. | |

FOREIGN PATENT DOCUMENTS

| | | |
|---|---|---|
| CN | 102099829 A | 6/2011 |
| CN | 102201032 A | 9/2011 |
| CN | 102842089 A | 12/2012 |
| CN | 102890742 A | 1/2013 |
| CN | 103049854 A | 4/2013 |
| CN | 103455501 A | 12/2013 |
| CN | 103597519 A | 2/2014 |
| CN | 103605832 A | 2/2014 |
| CN | 107564063 A | 1/2018 |
| DE | 19922150 A1 | 11/2000 |
| EP | 2091015 A1 | 8/2009 |
| EP | 2187325 A1 | 5/2010 |
| EP | 3155560 A1 | 4/2017 |
| JP | 2001-319108 A | 11/2001 |
| WO | 2010/060113 A1 | 5/2010 |
| WO | 2012/110828 A1 | 8/2012 |
| WO | 2013/188908 A1 | 12/2013 |
| WO | 2014/182545 A1 | 11/2014 |
| WO | 2015/185110 A1 | 12/2015 |
| WO | 2016/106193 A1 | 6/2016 |
| WO | 2016/106216 A2 | 6/2016 |
| WO | 2016/106216 A3 | 8/2016 |
| WO | 2016/160776 A1 | 10/2016 |
| WO | 2017/095834 A1 | 6/2017 |
| WO | 2017/142772 A1 | 8/2017 |
| WO | 2020/076871 A1 | 4/2020 |

OTHER PUBLICATIONS

Non-Final Office Action received for U.S. Appl. No. 14/581,351, dated Nov. 30, 2017, 16 pages.
Notice of Allowance received for U.S. Appl. No. 14/581,351, dated May 3, 2019, 18 pages.
Notice of Allowance received for U.S. Appl. No. 14/581,351, dated Sep. 12, 2019, 8 pages.
Response to Advisory Action filed on Jan. 10, 2019, for U.S. Appl. No. 14/581,351, dated Nov. 26, 2018, 17 pages.
Response to Final Office Action filed on Oct. 11, 2018, for U.S. Appl. No. 14/581,351, dated Aug. 10, 2018, 32 pages.
Response to Non-Final Office Action filed on Apr. 13, 2018, for U.S. Appl. No. 14/581,351, dated Nov. 30, 2017, 21 pages.
Advisory Action received for U.S. Appl. No. 14/581,351, dated Nov. 26, 2018, 9 pages.
Final Office Action received for U.S. Appl. No. 14/581,351, dated Aug. 10, 2018, 14 pages.
"Towards an Inclusive Virtual Dressing Room for Wheelchair-Bound Customers", 2014.
Applicant Initiated Interview Summary received for U.S. Appl. No. 13/722,818, dated Feb. 20, 2015, 3 pages.
Final Office Action received for U.S. Appl. No. 13/722,818, dated Apr. 15, 2015, 16 pages.
Final Office Action received for U.S. Appl. No. 13/722,818, dated Jul. 11, 2016, 23 pages.
Non-Final Office Action received for U.S. Appl. No. 13/722,818, dated Dec. 17, 2015, 21 pages.
Non-Final Office Action received for U.S. Appl. No. 13/722,818, dated Mar. 24, 2014, 22 pages.
Non-Final Office Action received for U.S. Appl. No. 13/722,818, dated Sep. 12, 2014, 16 pages.
Response to Final Office Action filed on Oct. 15, 2015, for U.S. Appl. No. 13/722,818, dated Apr. 15, 2015, 15 pages.
Response to Non-Final Office Action filed on Aug. 25, 2014, for U.S. Appl. No. 13/722,818, dated Mar. 24, 2014, 14 pages.
Response to Non-Final Office Action filed on Feb. 12, 2015, for U.S. Appl. No. 13/722,818, dated Sep. 12, 2014, 25 pages.
Response to Non-Final Office Action filed on Jun. 17, 2016, for U.S. Appl. No. 13/722,818, dated Dec. 17, 2015, 17 pages.
Applicant-Initiated Interview Summary received for U.S. Appl. No. 14/270,244, dated Apr. 6, 2017, 5 pages.
Final Office Action received for U.S. Appl. No. 14/270,244, dated Jul. 14, 2017, 37 pages.
Non-Final Office Action received for U.S. Appl. No. 14/270,244, dated Jan. 12, 2017, 35 pages.
Response to Non-Final Office Action filed on Apr. 4, 2017, for U.S. Appl. No. 14/270,244, dated Jan. 12, 2017, 12 pages.
Applicant Initiated Interview Summary received for U.S. Appl. No. 14/449,120, dated Apr. 21, 2017, 4 pages.
Non-Final Office Action received for U.S. Appl. No. 14/449,120, dated Feb. 8, 2017, 32 pages.
Response to Non-Final Office Action filed on Apr. 19, 2017, for U.S. Appl. No. 14/449,120, dated Feb. 8, 2017, 13 pages.
Preliminary Amendment filed for U.S. Appl. No. 14/474,003, on Oct. 3, 2014, 3 pages.
Non-Final Office Action received for U.S. Appl. No. 14/530,636, dated Nov. 5, 2015, 6 pages.
Notice of Allowance received for U.S. Appl. No. 14/530,636, dated Mar. 28, 2016, 8 pages.
Response to Non-Final Office Action filed on Mar. 7, 2016, for U.S. Appl. No. 14/530,636, dated Nov. 5, 2015, 8 pages.
Non-Final Office Action received for U.S. Appl. No. 14/556,677, dated May 18, 2017, 12 pages.
First Action Interview Office Action received for U.S. Appl. No. 14/568,187, dated Mar. 13, 2017, 5 pages.
Pre-Interview First Office Action received for U.S. Appl. No. 14/568,187, dated Oct. 6, 2016, 4 pages.
Response to First Office Action Interview—Office Action filed on May 15, 2017, for U.S. Appl. No. 14/568,187, dated Mar. 13, 2017, 11 pages.
Response to Pre-Interview First Office Action filed on Oct. 31, 2016, for U.S. Appl. No. 14/568,187, dated Oct. 6, 2016, 3 pages.
Non Final Office Action received for U.S. Appl. No. 14/568,251, dated Jun. 2, 2017, 24 pages.
Applicant-Initiated Interview Summary received for U.S. Appl. No. 14/569,197, dated Apr. 28, 2017, 2 pages.
First Action Interview Office Action received for U.S. Appl. No. 14/569,197, dated Jun. 1, 2017, 4 pages.
Pre-Interview First Office Action received for U.S. Appl. No. 14/569,197, dated Oct. 11, 2016, 4 pages.
Response to First Action Pre-Interview Communication filed on Oct. 31, 2016, for U.S. Appl. No. 14/569,197, dated Oct. 11, 2016, 3 pages.
Applicant-Initiated Interview Summary received for U.S. Appl. No. 14/578,414, dated Jun. 7, 2017, 3 pages.
Non-Final Office Action received for U.S. Appl. No. 14/578,414, dated Mar. 9, 2017, 26 pages.
Response to Non-Final Office Action filed on May 31, 2017, for U.S. Appl. No. 14/578,414, dated Mar. 9, 2017, 17 pages.
Final Office Action received for U.S. Appl. No. 14/579,936, dated Jul. 10, 2017, 25 pages.
Response to Non Final Office Action filed on May 31, 2017, for U.S. Appl. No. 14/579,936, dated Mar. 24, 2017, 19 pages.
Advisory Action received for U.S. Appl. No. 14/580,072, dated Aug. 30, 2017, 3 pages.
Applicant-Initiated Interview Summary received for U.S. Appl. No. 14/580,072, dated Feb. 1, 2017, 3 pages.

(56) References Cited

OTHER PUBLICATIONS

Applicant Initiated Interview Summary received for U.S. Appl. No. 14/580,072, dated Dec. 15, 2017, 3 pages.
Final Office Action received for U.S. Appl. No. 14/580,072, dated Jun. 16, 2017, 35 pages.
First Action Interview—Office Action Summary received for U.S. Appl. No. 14/580,072, dated Jan. 27, 2017, 4 pages.
First Action Pre-Interview Communication received for U.S. Appl. No. 14/580,072, dated Oct. 12, 2016, 5 pages.
Non-Final Office Action received for U.S. Appl. No. 14/580,072, dated Sep. 26, 2017, 11 pages.
Notice of Allowance received for U.S. Appl. No. 14/580,072, dated Jan. 29, 2018, 7 pages.
Response to Final Office Action filed on Aug. 16, 2017, for U.S. Appl. No. 14/580,072, dated Jun. 16, 2017, 17 pages.
Response to First Action Interview filed on Mar. 27, 2017, for U.S. Appl. No. 14/580,072, dated Jan. 27, 2017, 11 pages.
Response to Non-Final Office Action filed on Dec. 27, 2017, for U.S. Appl. No. 14/580,072, dated Sep. 26, 2017, 12 pages.
Applicant-Initiated Interview Summary for U.S. Appl. No. 15/182,267, dated Jan. 6, 2017, 3 pages.
Final Office Action received for U.S. Appl. No. 15/182,267, dated Mar. 8, 2017, 11 pages.
Non-Final Office Action received for U.S. Appl. No. 16/596,394, dated Oct. 15, 2020, 28 Pages.
Response to Office Action filed on Jul. 15, 2020 for Chinese Patent Application No. 201580076565.0, dated Mar. 18, 2020, 19 pages (11 pages of official copy & 8 pages of English Translation of claims).
Office Action received for Chinese Patent Application No. 201580076629.7, dated Sep. 11, 2020, 17 pages (10 pages of English Translation and 7 pages of Official Copy).
Response to Office Action Filed on Jul. 13, 2020, for Chinese Patent Application No. 201580076629.7, dated Mar. 4, 2020, 22 Pages (13 pages of official copy & 9 pages of English translation of claims).
Xiang et al., "Subcategory-Aware Convolutional Neural Networks for Object Proposals and Detection", IEEE Winter Conference on Applications of Computer Vision (WACV), Mar. 24-31, 2017, 10 pages.
Office Action received for Chinese Patent Application No. 201580076565.0, dated Mar. 18, 2020, 30 pages (14 pages of Official Copy Only and 16 pages of English Translation).
Office Action received for Chinese Patent Application No. 201580076629.7, dated Mar. 4, 2020, 42 Pages (20 pages of Official Copy and 22 pages of English Translation).
International Search Report Received for PCT Patent Application No. PCT/US2019/055263, dated Jan. 21, 2020, 6 pages.
International Written Opinion received for PCT Patent Application No. PCT/US2019/055263, dated Jan. 21, 2020, 7 pages.
Office Action Received for Chinese Patent Application No. 201580076565.0, dated Dec. 3, 2020, 3 pages (official copy only).
"AR Object Toolkit—Augmented Reality For Shopping, Merchandising, Product Demos and More," Retrieved from the Internet URL: https://www.groovejones.com/ar_object_toolkit/, Accessed on Jul. 3, 2020, 9 pages.
Response to Office Action filed on Nov. 16, 2020, for Chinese Patent Application No. 201580076629.7 dated Sep. 11, 2020, 22 Pages (13 pages of official copy & 9 pages of English translation of claims).
Yang et al., "Detailed Garment Recovery from a Single-View Image", Retrieved from the Internet URL :<https://arxiv.org/pdf/1608.01250.pdf>, 2016, pp. 1-13.
Selle et al., "Robust High-Resolution Cloth Using Parallelism, History-Based Collisions and Accurate Friction", IEEE Transactions on Visualization and Computer Graphics, vol. 15, No. 2, 2009, Mar.-Apr. 2009, pp. 339-350.
Satish et al., "IEEE Xplore Abstract—Can Traditional Programming Bridge the Ninja Performance Gap for Parallel Computing Applications?", Retrieved from the Internet URL: <http://ieeexplore.ieee.org/xpl/articleDetails.jsp?reload=true&arnumber=62-37038>, 2012, 3 pages.

Rudolph et al., "A Simple Load Balancing Scheme for Task Allocation in Parallel Machines", Retrieved from the Internet URL :<http://people.csail.mit.edu/rudolph/Autobiography/LoadBalancing.pdf>, 1991, pp. 237-245.
Photoshop, "Placing An Image Inside of Another with Photoshop CS6", Retrieved from the Internet URL: <http://www.photoshopessentials.com/photo-effects/placing-an-image-inside-another-with-photoshop-cs6/>, Sep. 9, 2014, 6 pages.
Written Opinion received for PCT Application No. PCT/US2016/024659, dated Jun. 10, 2016, 6 pages.
International Search Report received for PCT Patent Application No. PCT/US2016/024659, dated Jun. 10, 2016, 2 pages.
Styku, "Styku Startup Revolutionizes Apparel Shopping, Reduces Returns with Virtual Fitting Room", Retrieved from the Internet URL: <file:///C:/Users/swadhwa/Downloads/Styku_Kinect_CaseStudy%20(1).pdf>, Nov. 6, 2012, 7 pages.
Sven "An Introduction to Image Enhancement in the Spatial Domain", Department of Mathematics and Computer Science, Nov. 17, 2000, 25 pages.
Non-Final Office Action received for U.S. Appl. No. 15/182,267, dated Sep. 12, 2016, 10 pages.
Preliminary Amendment filed for U.S. Appl. No. 15/182,267, on Jul. 14, 2016, 7 pages.
Response to Final Office Action filed on Apr. 25, 2017, for U.S. Appl. No. 15/182,267, dated Mar. 8, 2017, 9 pages.
Response to Non-Final Office Action filed on Feb. 13, 2017, for U.S. Appl. No. 15/182,267, dated Sep. 12, 2016, 8 pages.
Extended European Search report received for European Patent Application No. 15874235.3, dated Aug. 18, 2017, 7 pages.
Response to Extended European Search report filed on Mar. 7, 2018, for European Patent Application No. 15874235.3, dated Aug. 18, 2017, 19 pages.
Extended European Search report received for European Patent Application No. 15874249.4, dated Nov. 6, 2017, 10 pages.
Basenese, "Virtual Fitting Rooms . . . Coming to a Store Near You", Retrieved from the Internet URL: <https://www.wallstreetdaily.com/2011/07/07/virtual-filling-rooms-fits-me/>, Aug. 13, 2014, 2 pages.
Binkley, "The Goal: A Perfect First-Time Fit: True Fit Is Online Retailers Latest Attempt to Help Consumers Buy Right Size; No Tape Measures", Retrieved from the Internet URL: <http://online.wsj.cominewslarticies/SB10001424052702304724404577293593210807790#printMode>, Mar. 23, 2012, 4 pages.
Bossard et al., "Apparel classification with Style", Retrieved from the Internet URL: <http://www.vision.ee.ethz.ch/~lbossard/bossard_accv12_apparel-classification-with-style.pdf>, 2012, pp. 321-335.
Bryant, "Fits.me Launches Robot to Help Women Size Up Clothes Online", Retrieved from the Internet URL : <https://thenextweb.com/eu/2011/06/10/fits-me-launches-robot-to-help-women-size-up-clothes-online/#.tnw_BRXPLr8L>, Jun. 10, 2011, 4 pages.
Chang, "Virtual Fitting Rooms Changing the Clothes Shopping Experience", Retrieved from the Internet URL: <http://articles.latimes.com/2012/Jul/13/business/la-fi-virtual-dressing-room-20120714>, Jul. 13, 2012, 2 pages.
Cheng et al., "A 3D Virtual Show Room for Online Apparel Retail Shop", In Proceedings: APSIPA ASC 2009: Asia-Pacific Signal and Information Processing Association, 2009, Annual Summit and Conference, Oct. 4-7, 2009, pp. 193-199.
Criminisi et al., "Single View Metrology", International Journal of Computer Vision, vol. 40, Issue 2, Jan. 1, 2000, pp. 123-148.
Fuhrmann et al., "Interaction-Free Dressing of Virtual Humans", Computers & Graphics 27, No. 1, 2003, pp. 71-82.
Gioberto, "Garment-Integrated Wearable Sensing for Knee Joint Monitoring", Proceedings of the 2014 ACM International Symposium on Wearable Computers: Adjunct Program, Sep. 13-17, 2014, pp. 113-118.
Gioberto et al., "Overlock-Stitched Stretch Sensors: Characterization and Effect of Fabric Property", Journal of Textile and Apparel, Technology and Management, vol. 8, Issue 3, 2013, 14 pages.
Hughes et al., "Physical Simulation for Animation and Visual Effects: Parallelization and Characterization for Chip Multiprocessors", In ACM SIGARCH Computer Architecture News, vol. 35, No. 2, May 2007, pp. 220-231.

(56) References Cited

OTHER PUBLICATIONS

Jojic et al., "A Framework for Garment Shopping Over the Internet", Handbook on Electronic Commerce, 2000, pp. 249-270.
Karsch et al., "Rendering Synthetic Objects into Legacy Photographs", ACM Transactions on Graphics (TOG), vol. 30, No. 6, 2011, 12 pages.
Kristensen et al., "Towards a Next Generation Universally Accessible, Online Shopping-for-Apparel System", 2013, pp. 418-427.
Li et al., "Wearable Sensors in Intelligent Clothing for Measuring Human Body Temperature Based on Optical Fiber Bragg Grating", Retrieved from the Internet: <URL: htp://ro.uow.edu.au/eispapers/298>, Optics Express, vol. 20, Issue 11, May 9, 2012, pp. 11740-11752.
Lim et al., "Characterization of Noise in Digital Photographs for Image Processing", In Electronic Imaging 2006, International Society for Optics and Photonics, Feb. 10, 2006, 10 pages.
Luo et al., "Reactive 2D/3D Garment Pattern Design Modification", Computer-Aided Design, vol. 37, No. 6, May 2005, pp. 623-630.
Niceinteractive, "Virtual Dressing Room", Retrieved from the Internet URL: <https://www.youtube.com/watch?v=UhOzN2z3wtl>, Sep. 3, 2012, 2 pages.
O'Brien, "Fits.me—Imitates Ladies of All Shapes and Sixes, Tries Clothes on for you (video)", Retrived from the Internet URL: <https://www.engadget.com/2011/06/13/fits-me-imitates-ladies-of-all-shapes-and-sizes-tries-clothes-o/>, Jun. 13, 2011, 10 pages.
Okreylos, "3D Video Capture with Three Kinects", Retrieved from the Internet URL: <https://www.youtube.com/watch?v=Ghgbycqb92c>, May 13, 2014, 3 pages.
International Search Report received for PCT Application No. PCT/US2015/067009, dated Feb. 26, 2016, 2 pages.
Written Opinion received for PCT Application No. PCT/US2015/067009, dated Feb. 26, 2016, 6 pages.
International Preliminary Report on Patentability received for PCT Patent Application No. PCT/US2015/067044, dated Jul. 6, 2017, 9 pages.
International Search Report received for PCT Patent Application No. PCT/US2015/067044, dated Mar. 11, 2016, 2 pages.
Written Opinion received for PCT Application No. PCT/US2015/067044, dated Mar. 11, 2016, 7 pages.
International Preliminary Report on Patentability received for PCT Patent Application No. PCT/US2015/067106, dated Jul. 6, 2017, 15 pages.
International Search Report received for PCT Application No. PCT/US2015/067106, dated Jul. 5, 2016, 3 pages.
Written Opinion received for PCT Application No. PCT/US2015/067106, dated Jul. 5, 2016, 13 pages.
Non-Final Office Action received for U.S. Appl. No. 14/579,936, dated Mar. 24, 2017, 36 pages.
Final Office Action Received for U.S. Appl. No. 16/596,394, dated Apr. 1, 2021, 33 Pages.
Notice of Allowance Received for U.S. Appl. No. 16/596,394, dated Jun. 2, 2021, 13 Pages.
Office Action received for Chinese Patent Application No. 201580076629.7 dated Apr. 2, 2021, 4 Pages (3 pages of Official Copy and 1 Page of English translation).
Gardner et al., "Learning to Predict Indoor illumination from a Single Image", 2017. (Year: 2017), 2017, 13 Pages.
International Preliminary Report on Patentability Received for PCT Patent Application No. PCT/US2019/055263, dated Apr. 22, 2021, 9 Pages.
Corrected Notice of Allowability Received for U.S. Appl. No. 16/596,394, dated Jul. 28, 2021, 2 Pages.

\* cited by examiner

US 11,270,373 B2

METHOD SYSTEM AND MEDIUM FOR GENERATING VIRTUAL CONTEXTS FROM THREE DIMENSIONAL MODELS

CLAIM PRIORITY

This application is a continuation of and claims priority to U.S. patent application Ser. No. 14/581,351, filed Dec. 23, 2014, entitled "Method System and Medium for Generating Virtual Contexts From Three Dimensional Models," the disclosure of which is hereby incorporated by reference herein in its entirety.

TECHNICAL FIELD

The present application relates generally to the technical field of computer modeling image processing and, in certain example embodiments, to generating virtual contexts for wearable item images in an online shopping environment.

BACKGROUND

Shopping for clothes in physical stores can be an arduous task and, due to travelling and parking, can be very time consuming. With the advent of online shopping, consumers may purchase clothing, while staying home, via a computer or any electronic device connected to the Internet. Additionally, purchasing clothes online can be different in comparison to purchasing clothes in a store. One difference is the lack of a physical dressing room to see if and how an article of clothing fits the particular consumer.

The systems and methods described in the present disclosure attempt to provide solutions to the problems presented above.

DESCRIPTION OF EMBODIMENTS

Figure 1:
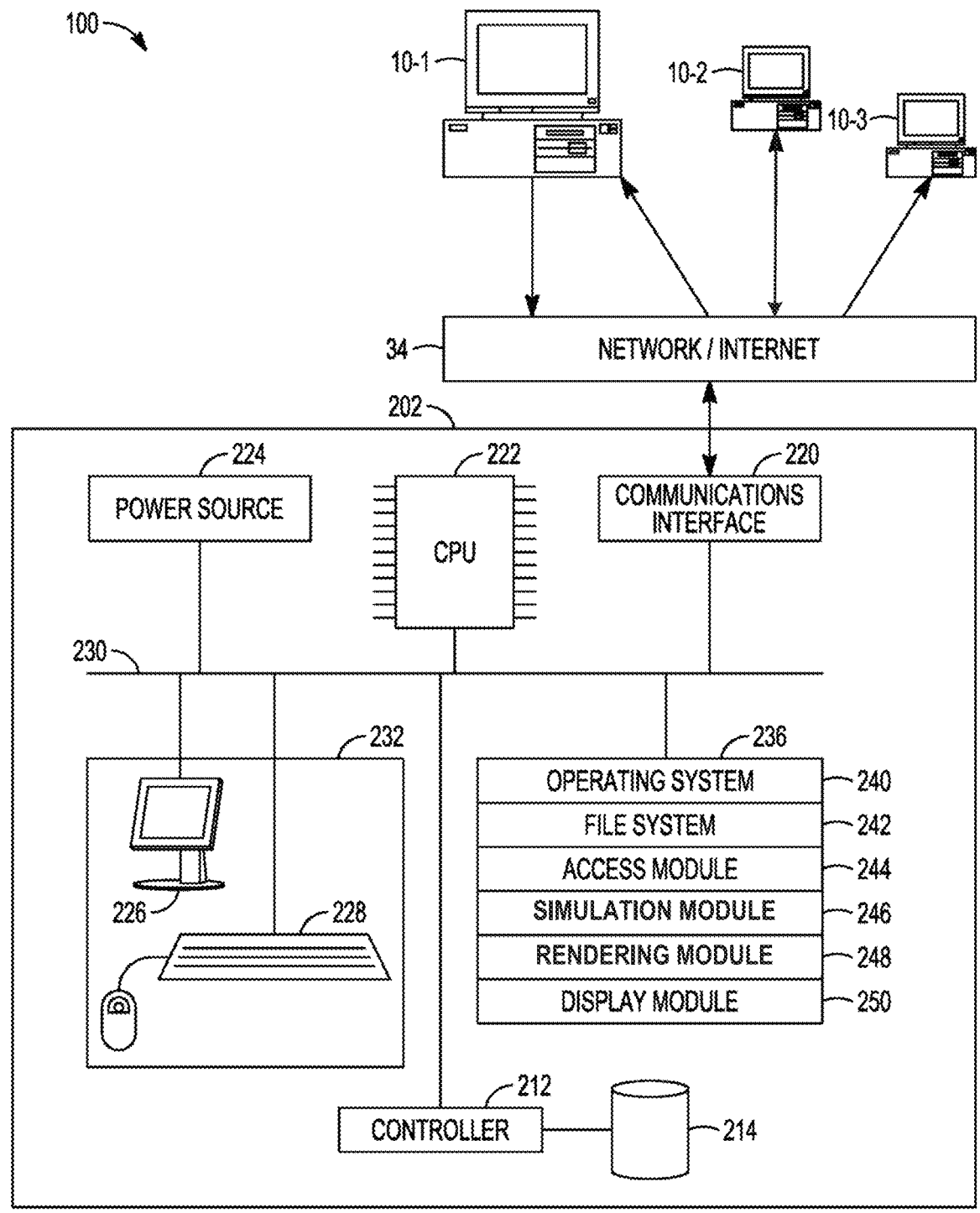
FIG. 1 illustrates an example system for generating virtual contexts in accordance with certain example embodiments.

Example systems and methods for image processing are described, including systems and methods for generating and displaying item images with a selectable virtual context. Such context images may, in certain embodiments, be implemented as part of a virtual dressing room in an online storefront, merchant portal, or publication network.

Such systems may provide a contextual showcasing of a product as a way to enhance a user experience. Seeing a piece of apparel, footwear, clothing accessory, or jewelry in a context of different environmental situations can significantly enhance a shopping experience. Certain online shopping experience may suffer from an inability to directly experience an item, but providing a modeled image processed into multiple different contexts may counteract this deficiency of shopping remotely via a network, and may further provide a new experience that was previously unavailable to a shopper For example, a customer may be looking for a dress for a night out with friends. The customer may use a networked computing device to access an online store which offers a virtual dressing room with selectable background contexts. When the customer has selected several dresses as purchase options, the customer may also select a store provided environment model from several different options, such as a formal dinner environment, a park environment, a beach environment, a home environment, and other such environments. An model associated with the environment is preprocessed prior to the client selection to identify one or more placement volumes within the environment model that are suitable for placing a body model in a model of the dress. The model of the dress may be generated from photographs of the dress, may be generated from computer aided design (CAD) files, or from supplier or manufacturing data. When the system has both the model of the environment with an identified placement volume, and the model of the wearable item, the system may place a body model wearing the item in a placement volume to create a context model. Various rendering values related to lighting, shadows, and other such rendering variables may be set and adjusted as part of rendering an image from the context model. In image of the dress in a user selected context may then be displayed on a screen. A user interface on the customer's device may enable the customer to perform the same process for multiple selected dresses to switch back and forth between representations of each dress selected by the user in the selected environment. Similarly, a user may switch between different environments for the same dress, in order to view the dress in different contexts. Each selection may generate a new context model, with an image rendered from the generated context model in response to the user selections.

In other example embodiments, a user may provide an environment image from a photograph taken by the user. A system may analyze the image to identify or modify an existing environment model. This environment model may then be combined with a clothed body model to generate a context model, and images from the context model may be presented to the user. For example, a user may take a photograph with a mobile device, and have that photograph processed as an environment image to identify or generate an environment model an associated placement volume as discussed above. The model of the dress draped on a body model may then be added to the environment model identified from the user's photograph. In certain embodiments, if the system may provide an initial placement volume and image perspective, but an option may be provided to select other pre-computed placement volumes and/or perspectives. A user interface may be used to move the wearable item model to different placement volumes within the environment model, where new context images may be rendered from the updated context model.

Various such embodiments may improve the efficiency of network usage for providing item modeling in a user selected context, may generate efficiencies in processor usage based on image processing optimizations, and may enhance an online shopping experience. When these effects are considered in aggregate, one or more of the methodologies described herein may obviate a need for certain efforts or resources that otherwise would be involved presenting images in different contexts, with distributed resource usage optimized. Efforts expended by a user in generating 3-D models may be reduced by one or more of the methodologies described herein. Computing resources used by one or more machines, databases, or devices (e.g., within different elements of the system 100) may similarly be reduced or optimized. Examples of such computing resources include processor cycles, network traffic, memory usage, data storage capacity, power consumption, and cooling capacity.

Additionally, a major difference between shopping for an article online as compared to experiencing it physically in a store is the amount of detail a customer can perceive about it. This difference constitutes a major barrier to the efficacy of digital commerce. Embodiments described herein provide a shopper with additional detail about a potential purchase, and such techniques help customers overcome the physical versus digital barrier can and can therefore enhance the potency of the online commerce channel that uses embodiments described herein.

FIG. 1 is a block diagram illustrating a system 100 in accordance with example embodiments. The system 100 includes networked devices 10 connected to a computing device 202 via a network 34 (e.g., the Internet). The computing device 202 typically includes one or more processing units (CPUs) 222 for executing modules, programs, or instructions stored in a memory 236 and thereby performing processing operations; one or more communications interfaces 220; the memory 236; and one or more communication buses 230 for interconnecting these components. The communication buses 230 optionally include circuitry (e.g., a chipset) that interconnects and controls communications between system components. The computing device 202 also optionally includes a power source 224 and a controller 212 coupled to a mass storage 214. The system 100 optionally includes a user interface 232 comprising a display device 226 and a keyboard 228.

The memory 236 includes high-speed random access memory, such as dynamic random-access memory (DRAM), static random-access memory (SRAM), double data rate random-access memory (DDR RAM), or other random-access solid state memory devices; and may include non-volatile memory, such as one or more magnetic disk storage devices, optical disk storage devices, flash memory devices, or other non-volatile solid state storage devices. The memory 236 may optionally include one or more storage devices remotely located from the CPU 222. The memory 236, or alternately the non-volatile memory device within the memory 236, comprises a non-transitory computer-readable storage medium. In some example embodiments, the memory 236, or the computer-readable storage medium of the memory 236, stores the following programs, modules and data structures, or a subset thereof: an operating system 240; a file system 242; an access module 244; a simulation module 246; a rendering module 248; and a display module 250.

The operating system 240 can include procedures for handling various basic system services and for performing hardware-dependent tasks. The file system 242 can store and organize various files utilized by various programs. The access module 244 can communicate with devices 10 via the one or more communications interfaces 220 (e.g., wired, wireless), the network 34, other wide area networks, local area networks, metropolitan area networks, and so on. Additionally, the access module 244 can access information for the memory 236 via the one or more communication buses 230.

The simulation module 246 can be used to generate and modify three dimensional models, including environment models, body models, and wearable item models. Simulation module 246 can additionally process a model to identify volumes within the model and viewing perspectives based on items within the model. Still further, in some embodiments, a simulation module may be used to generate three dimensional models of items from multiple two dimensional images of photographs of a physical environment. Additional details of such models and placement processing are discussed below, particularly with respect to FIGS. 2-4.

In addition to processing models of an environment and models of wearable items, simulation module 246 may additional use body models which may be based on a user or another person to represent a body that is wearing an item in a context image. Simulation module 246 may thus generate a three-dimensional body model based on the body measurement of a person, a photograph of a person, or other information associated with a person. Additionally, the garment simulation module 246 can position the body model inside the garment model. Moreover, the garment simulation module can calculate simulated forces acting on garment points associated with the garment model based on the positioning of the body model inside the garment model. Such modeling may generate an accurate representation of the wearable item as worn by a body model, and may then be used in an environment image. Certain embodiments may additionally model the impact of wind on a wearable item, and the impact of fabric characteristics on the way a wearable item drapes on a body model.

While simulation module 246 deals with the processing of elements which may be used in generate context models, it also deals with merging these elements into a single context model. Simulation module 246 can generate a clothed body model using a model of an item by modeling the placement of the body model within the wearable item model, or by attaching the wearable item model to the body model. Once a body model and a wearable item model are merged to generate a clothed body model, the clothed body model may be merged with an environment model to generate a context model. Any of the models may be changed to generate a new context model by, for example switching body models, wearable item models, or environment models. Additional details of simulation modules such as simulation module 248 are also discussed below.

Rendering module 248 then takes a context model generated by simulation module 246, and renders a two dimensional image that may be displayed to a user as a context image. Rendering module 248 may be used to adjust rendering values related to shadows, lighting, image perspective, or other such rendering characteristics.

An image rendered by rendering module 248 may then be passed to display module 250 for display on an output device. Display module 250 can be configured to cause presentation of the generated context image on a display of any device or on multiple devices. For example, the display module can present a set of wearable items for selection by a user, a set of environments for selection by a user, and an item context image that merges the item and environments selected by a user. A user interface may enable a user to control the image output using display module 250 in order to show different wearable items within the same context or to show a certain item within different contexts. As user selections are made, associated context models are generated by merging model elements, and images are rendered from the context models. Efficient use of computing resources may be enabled using pre-computed model elements, or a mix of pre-computed and newly generated model elements.

The network 34 may be any network that enables communication between or among machines, databases, and devices (e.g., the computing device 202 and the client device 10-1). Accordingly, the network 34 may be a wired network, a wireless network (e.g., a mobile or cellular network), or any suitable combination thereof. The network 34 may include one or more portions that constitute a private network, a public network (e.g., the Internet), or any suitable combination thereof. Accordingly, the network 34 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or a WiMAX network), or any suitable combination thereof. Any one or more portions of the network 34 may communicate information via a transmission medium.

The computing device 202 and the networked devices 10 (e.g., merchant device 10-1, the client device 10-2, the network server device 10-3) may each be implemented in a computer system, in whole or in part, as described below. Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect the figure detailing an example computing device below. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

Figure 2:
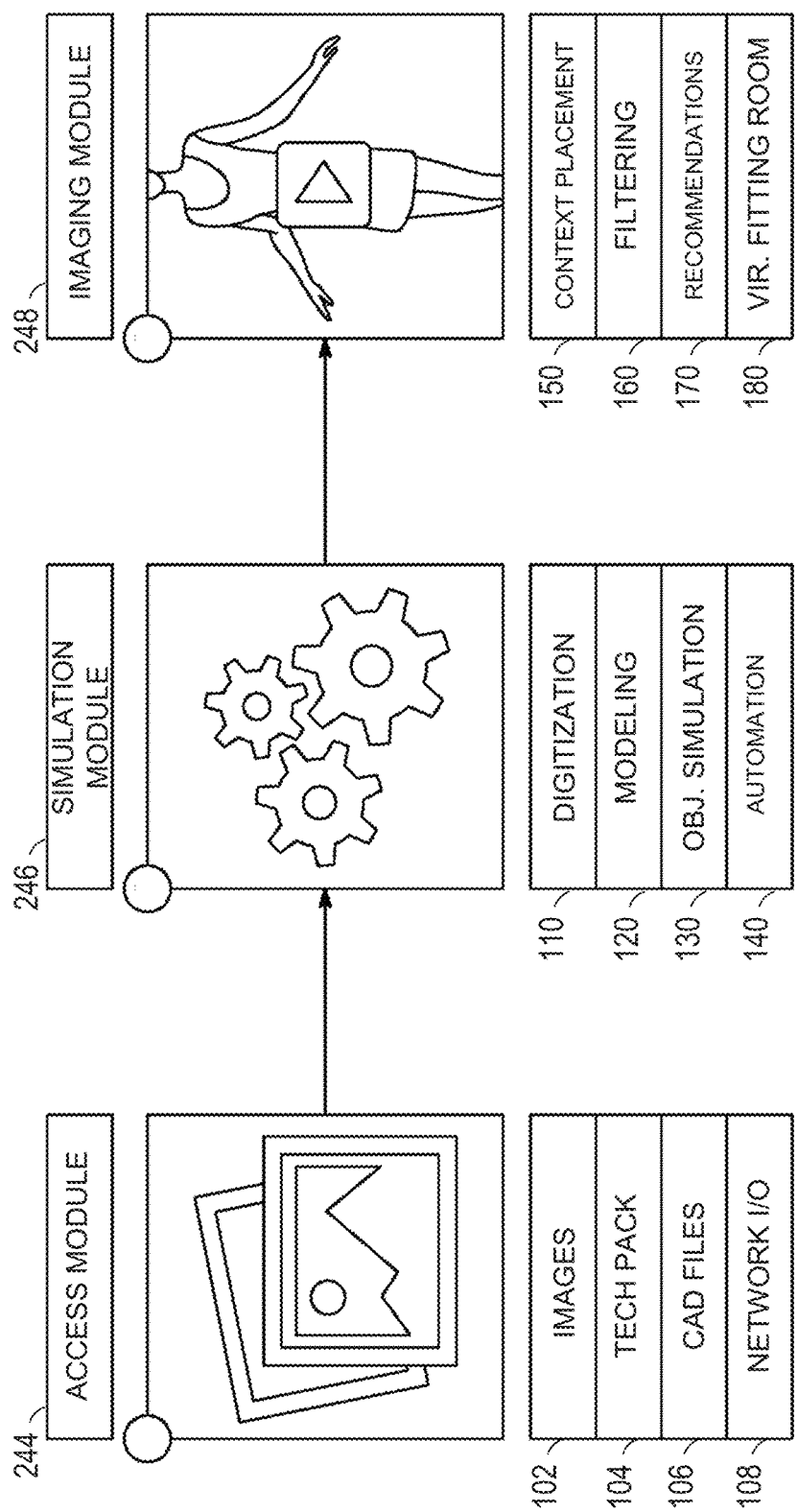
FIG. 2 illustrates aspects of a system for generating virtual contexts in accordance with certain example embodiments.

FIG. 2 then illustrates certain details one possible implementation of an access module, a simulation module, and a rendering module such as access module 244, simulation module 246, and rendering module 248 according to certain embodiments.

Access module 244 includes images module 102, technology package module 104, computer aided drafting (CAD) files module 106, and network interface module 108. Access module 244 is configured to receive a set of context data, the context data comprising a first environment model depicting a first environment. Simulation module 246 includes digitization module 110, modeling module 120, object simulation module 130, and automation module 140. Simulation module 246 is coupled to the access module 248 and is configured to manage the generation of context models a first context models, including pre-computation of placement volumes and associated perspectives for environment models. Rendering module 248 comprises context placement module 150, filtering module 160, recommendation module 170, and virtual fitting room module 180. Rendering module 248 is configured to generate context images from context models created by simulation module 246. In other embodiments each of these modules may be implemented individually or together in any possible combination. Each of these modules is described in additional detail below with respect to FIGS. 3 and 4.

Figure 3:
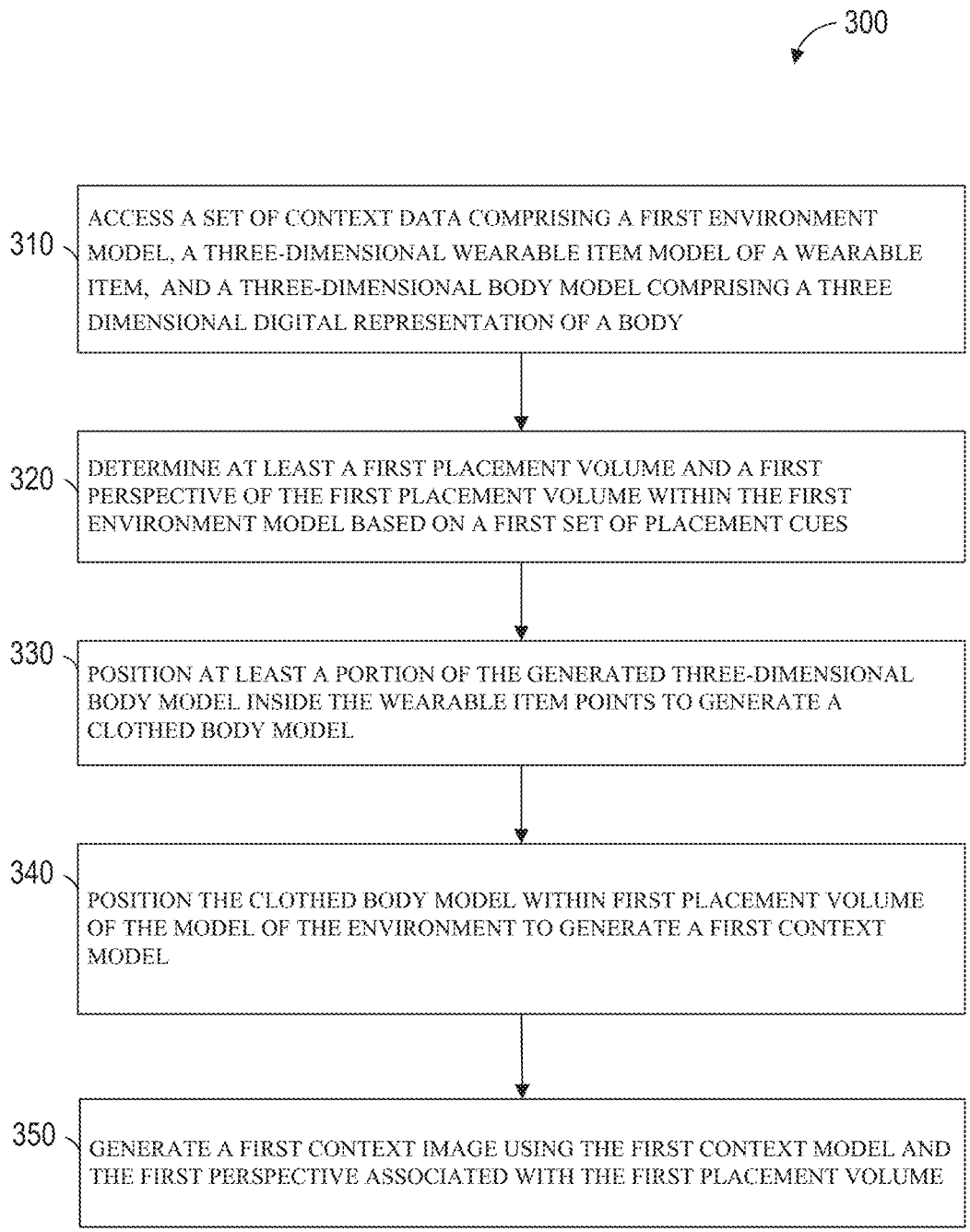
FIG. 3 illustrates a method for generating virtual contexts in accordance with certain example embodiments.

FIG. 3 illustrates one example method 300 according to the embodiments described herein. While method 300 is described with respect to the elements of FIGS. 1 and 2, method 300 may be implemented using alternative devices and modules in different embodiments. Method 300 begins with operation 310, which includes accessing a set of context data, the set of context data comprising a first environment model of a first environment. This also includes accessing a three-dimensional wearable item model of a wearable item, the three-dimensional wearable item model including wearable item points that represent a surface of the wearable item and accessing a three-dimensional body model comprising a three dimensional digital representation of a body. In various implementations, this data may be accessed together or separately. The access of different types of data may additionally reoccur during system operation depending on user selections of contexts, items, and body models.

The set of context data includes at least a first environment model depicting a first environment. In various embodiments, the set of context data may include any number of environment images, environment models, objects to be added to an environment model, or other such elements. This data may be received in a single continuous stream of data or in separate communications each containing all or part of a single element of the environment that is to provide context to an item. Such environment models and model elements may be accessed from a number of different sources. Images module 102 may include environment images or images used to create environments or individual objects in an environment, stored in a memory of the device that includes access module 244. Technology package module 104 may include various types of environment models and environment data, including three dimensional environment information that may be used to generate a three dimensional model of an environment, and to generate a two dimensional image of the environment as the environment image that may be part of a selectable interface provided to a user to select different environments for context. This may be done by rendering any two dimensional image using the environment model. In certain embodiments, this rendering may be performed using a viewpoint calculated as the preferred perspective of the placement volume, as described herein. Technology package module 104 may additionally include information about lighting, wind, body models, fabric models, or other data about an environment that may be used to generate an environment model in certain embodiments. CAD files module 106 may include CAD files describing an environment, an object, or a body. In certain embodiments, CAD files module 106 and technology package module 104 may function together to render the environment image from a three dimensional computer model of the environment that is acting as one context. Additionally, in certain embodiments, any of the above sources of an environment image may be located remotely from the device, and network interface module 108 may communicate with database devices or other computing devices to retrieve any part of the set of context data.

In addition to the access of the set of context data, access module 244 may access a set of wearable item data. This may be an image as described above, or may be model information as part of technology package module 104, including model details such as fabric values for a fabric model to be used in generating a wearable item image. This set of wearable item data may be CAD data to be stored by CAD file module 106. In other embodiments, this may be a scanned set of images or other data to be used in generating a model of an item that will then be used to generate a wearable item image.

Operation 320 then involves determining at least a first placement volume and a first perspective of the first placement volume within the first environment model based on a first set of placement cues. Part of this determination may involve identifying individual elements of an environment to identify placement cues or environment cues. Such cues may be provided as part of a model of an environment or an object used in an environment. In other embodiments, cues may be inferred from sets of user interactions from many users as they select different attributes for different environment models. A first placement volume within the first environment model may, in certain embodiments, be based on a floor segment and the placement characteristics of objects near the floor segment. In a simplest embodiment, a placement volume may be identified by a rectangular volume within the environment model where no obstruction is present between the volume and a preferred perspective, and a view of the placement volume is not obscured by items between the volume and the observation space at the perspective point. In certain embodiments, a preferred perspective may be determined by the background items visible from the perspective, and context cues or characteristic cues associated with the objects in the model. In one potential embodiment, a system includes a default elevation angle for a default perspective. The elevation angle refers to an angle formed by a line from the perspective point to a point in the ground area of the placement volume, and a line from the point in the ground area of the placement volume to a point in the ground directly below the perspective point. The system processes a set number of placement points in a full circle around the placement volume. For each placement point, a score may be associated with background items visible from each perspective. Additionally, a certain number of perspectives with elevation angles above and below the default elevation angle may also have calculated scores. Obstructions and excessive numbers of background objects may lower a score. Balanced placement of relevant background items may increase a score. A point with the highest score may be selected as a preferred perspective. In certain embodiments, placement cues may include proximity to objects that may be foreground or blocking objects for an item to be included in a placement volume. In certain embodiments, placement cues may be size details and object complexity details with objects that may be background objects or objects in the middle of the environment.

In certain embodiments, operation 320 may involve an identification of multiple placement volumes. For example, in one embodiment, determining at least the first placement volume includes operations to identify a plurality of unobstructed portions of the first ground area and for each of the plurality of unobstructed portions of the first ground area, determine an unobstructed distance from the unobstructed portion toward a ceiling segment. Unobstructed portions of the ground which do not have a sufficient unobstructed area above them may be rejected as candidates to be associated with a placement volume. A subsequent operation may then involve identifying a plurality of placement volumes comprising the first placement volume from the plurality of unobstructed portions of the first ground area and the associated unobstructed distance toward the ceiling segment for each unobstructed portions. In other words, each placement volume will be associated with a different unobstructed portion of the ground in the environment image. Each unobstructed portion of the ground will also have open space for a certain distance above the portion of the ground. A viewing volume from the perspective point to this portion of the ground is not blocked or otherwise obscured. The simulation module 246 will, in such an embodiment, then select the first placement volume from plurality of placement volumes based at least in part on a proximity of the placement volume to a set of obstruction objects and a set of relevant context objects of the context model.

In certain embodiments, all placement volumes that meet a threshold set of placement characteristics may be stored as placement information, with a user having a user interface input to move the wearable item model to different placement positions within the environment model. In other embodiments, each placement position may be given a placement score based on the environmental cues. Such environmental cues may be derived from segments having a context value within the environment image. A placement volume with a higher score may be selected as the only placement volume, or a selected number of placement volumes with the highest scores may be selected. In certain embodiments, a user interface may be provided for a system operator to interface with simulation module 246 to provide the system operator with selection options for placement volumes in an environment model being processed by simulation module 246. In other embodiments, such a selection may be made automatically by automation module 140 using any criteria described above.

In certain embodiments, the identification of placement volumes may be performed as a pre-processing step, without any interaction with a user. This placement volume data may then be sent as context information with an environment model that is used by simulation module to generate context models. In other embodiments, placement data may be performed in response to user selections of an environment or a particular wearable item or body model, with placement volumes selected based on characteristics of a body model or a selected wearable item model.

In another embodiment, an environment model consists of a three dimensional (3D) scene, with a floor, and other objects of interest—like table, chairs, or other synthesizable environment elements modeled using a set of 3D objects. A 3D space or bounding box is chosen where the clothed body model can be placed. In addition to the position of the 3D bounding box, a set of viewpoints is also computed. The viewpoints are computed in a way that the draped body model or the wearable item model fully visible and not obstructed. This may be done in certain embodiments by placing viewpoints uniformly within the whole scene, and pre-rendering with each viewpoint. A number of visible/obstructed pixels of the garment may be computed for each viewpoint, and viewpoints may be selected based on the number of visible pixels. As described above, an end-user may be given an option to select a viewpoint from certain sets of viewpoints.

Operation 330 then involves positioning at least a portion of the generated three-dimensional body model inside the wearable item points to generate a clothed body model. As described above, different body models and wearable item models may be selected by a user, and a simulation module may merge these models by "draping" a clothing model on a body model to generate a realistic clothed body model. Additional details related to generation of such clothed body models are described below with respect to FIGS. 8-9.

Operation 340 involves positioning the clothed body model within first placement volume of the model of the environment to generate a first context model. The generated context model may also have addition scene enhancers such as lighting, shadow strength, colorable item skins, or other rendering value elements that may be provided to a user as an option. All of these elements may be used in the final context model.

Operation 350 then involves generating a first context image using the first context model and the first perspective associated with the first placement volume. In various embodiments then, the scene of the context model from the selected perspective viewpoint is rendered using a physically accurate rendering process such as path-tracing to produce a context image as the final image at the desired end-device resolution. This image may then be compressed and sent to an output device or display element.

Figure 4A:
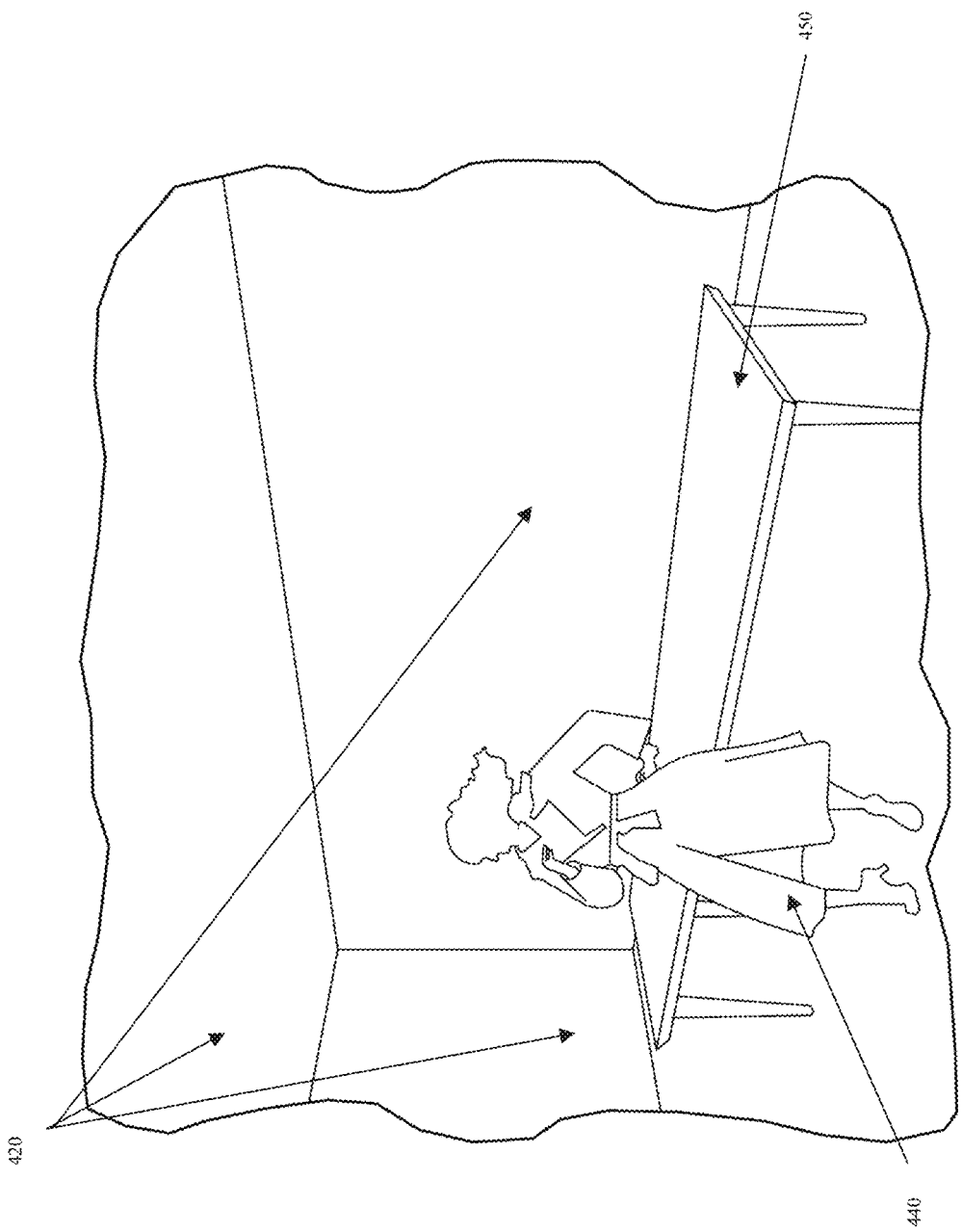
FIG. 4A illustrates aspects of generation of virtual contexts in accordance with certain example embodiments.
Figure 4B:
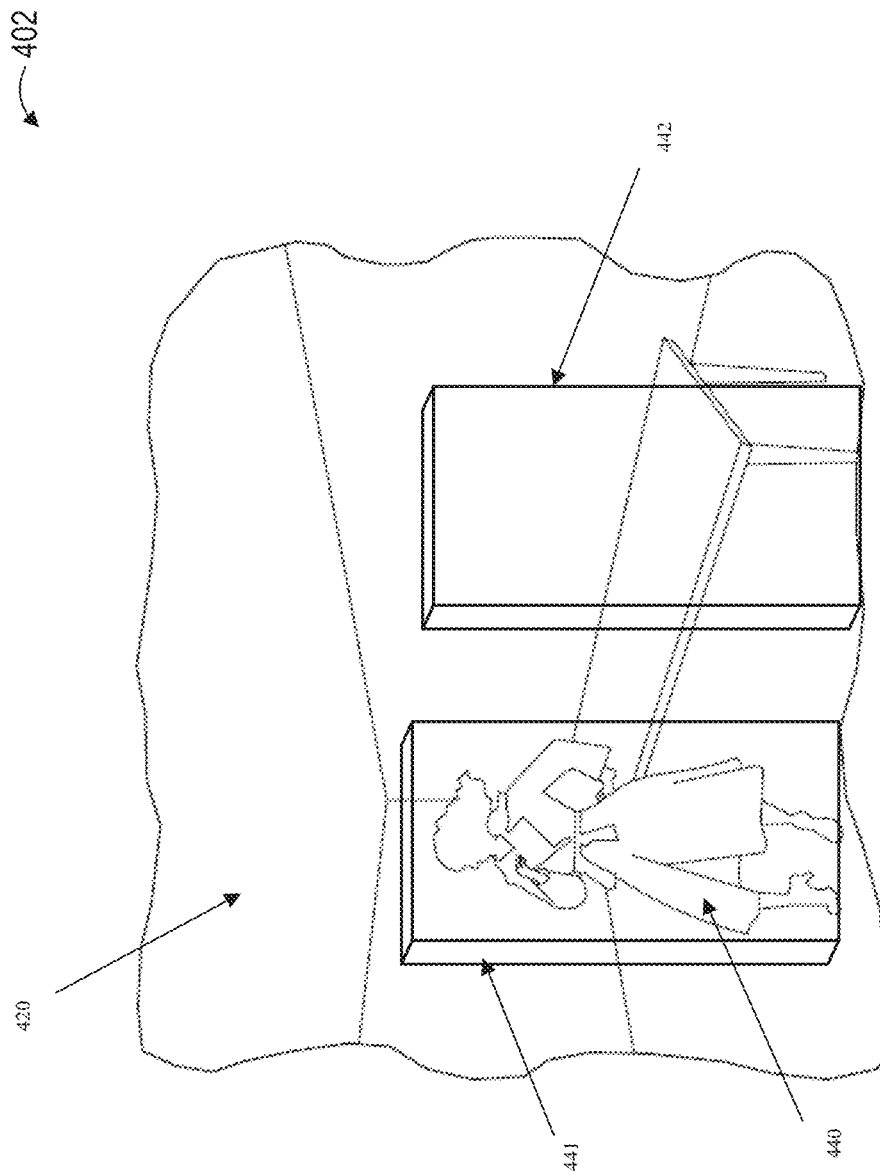
FIG. 4B illustrates aspects of generation of virtual contexts in accordance with certain example embodiments.

FIGS. 4A and 4B then illustrate a first example of a context image 401 generated from a first perspective of a context model. The context model used to generate context image 401 includes an environment model 420. An object model 420 is part of the environment model 420. A clothed body model 440 is also included.

FIG. 4B shows a second context image 402, which is a rendering of the same context model described in FIG. 4A including draped body model 440, environment model 420, and object model 450, but from a different perspective or viewpoint, as can be seen from the different angle of the elements of environment model 420. FIG. 4B also shows placement volumes 441 and 442. Such placement volumes may be determined as described above, or using any method to identify an appropriate placement space for a draped body model. In certain embodiments, a draped body model may be oriented to face the viewpoint. In other embodiments, the draped body model may have an orientation that is selectable by a user for each placement volume and each viewpoint. For each new orientation and placement volume positioning of draped body model 440, a new context model may be generated by adjusting the placement of the draped body model 440 within environment model 420. A user may additionally select different viewpoints or perspectives from the same context model without changing any placement of a draped body model 440. In such embodiments, a new image may be rendered from the different perspective without generation of a new context model.

Figure 5:
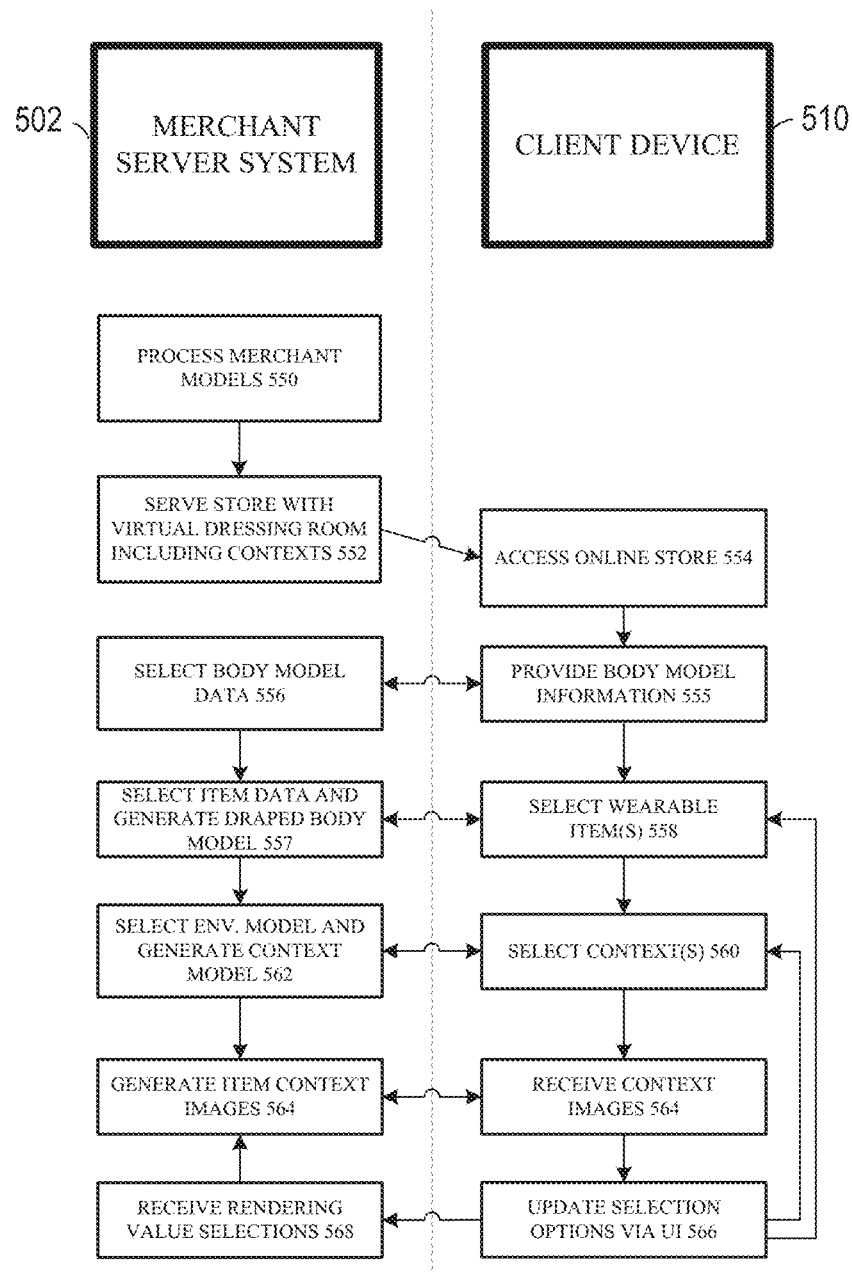
FIG. 5 illustrates a method for generating virtual contexts in accordance with certain example embodiments.

FIG. 5 then describes an implementation where a client device 510 accesses a merchant server system 502 as part of an online shopping transaction. In operation 550, the merchant server system 502 processes various models as part of pre-processing operation. For example context data in a pre-processing operation may be performed to access or generate environment models and identify placement volumes and associated viewpoints within the environment models. In certain embodiments, this may be performed by an access module similar to access module 244 and a simulation module similar to simulation module 246 both operating on merchant server system 502. In operation 552, merchant server system 502 serves an online store with a virtual dressing room including user selectable contexts. In operation 554, client device 510 accesses the online store.

As part of virtual dressing room interactions, a user of client device 510 selects a body model in operation 555. This may involve use of a default model without a user selection of a specific input, or it may involve communication of user measurements to merchant server system 502. Body model data selected by client device 510 is communicated to client device 510, and if a custom body model is selected, body model data may be communicated to a body modeling module of merchant server system 502 as part of operation 556. Body model data may include measurements for a generic model. Body model data may include CAD files of a body shape and size. Body model data may include a three dimensional model generated from two dimensional images. Body model data may include a body model size and shape estimated from a user's selected clothing that is identified as well fitting. Additional details and examples associated with body model selection are described below with respect to FIG. 6.

In operation 558, a user browsing the online store selects one or more wearable items in operation 558, and receives item data communication from merchant server system 502 in operation 557. In operation 560, a user of client device 510 selects a context, and in operation 562, merchant server system 502 uses this selection to identify or generate an environment model. In operation 562, then the merchant server system 502 has all of body model, wearable item model, and environment model information needed to generate a context model, and the context model is generated in operation 562.

A rendering module then generates a context image in operation 564 and communicates this context image to client device 510. Client device 510 then displays the context image on an output display of client device 510 as part of the virtual dressing room interaction. A user interface may be used in operation 566 to update body model selections, wearable item selections, or context selections. If the UI is used to update any of these selections, or other possible selections such as placement volume or draped body model orientation, the selections are processed by the system a new context model is generated in repeated instances of operation 562.

Operation 564 may additionally involve selection of rendering values which do not require the creation of a new context model. These values may include perspective or viewpoint selections and other rendering selections such as lighting values, shadow values, or other such variables used in rendering without required adjustments to the rendered model. Such selections may be sent from client device 510 to merchant server system 502 with to be received in operation 568 and directly used in rendering new images as part of a repeated instance of operation 564 using a previously created context model.

In certain alternative embodiments, rather than rendering a context image on merchant server system 502, the context model may be communicated to client device 510, and the context image may be rendered by a rendering module of client device 510. This allows different viewpoints to be selected and processed by client device 510 without a round trip communication to merchant server system 502 required for minor changes in viewpoint or color.

The process may then be repeated multiple times, with repeated instances of operation 566, where a user of client device 510 uses an interface of client device 510 to select an additional alternative context, wearable item, or other virtual dressing room selection. Updated item data or context data is received in response to this selection, and used to repeat the process of generating item context images for display on client device 510. This process proceeds until the client device exits the virtual dressing room. This may occur with a payment process executed using merchant server system 502, or with client device 510 terminating a connection to merchant server system 502 without completing a purchase.

In various different embodiments, modules of a system described in FIGS. 1, 2, 11, 12, and any other module described herein may be distributed in a system in various different ways. In one embodiment, a merchant computer such as merchant server system 502 may include an access module such as access module 244 and a simulation module such as simulation module 246, with a user device such as client device 510 including a rendering module such as rendering module 248. Any database elements may be stored at either device or in a networked device. Access modules and simulation modules in a merchant server system may communicate item data such as wearable item images for use in generating item models, context data such as environment models and environment images that may be used to create or update environment models, and any other data such as placement volume information associated with an environment model, across a network between the merchant server system and the client device.

In another embodiment, an access module, a simulation module, and a rendering module may all be on a single device. For example, a mobile device such as a smartphone, a tablet, or a laptop computer may include each of these modules, and may communicate with a database or a merchant server computer to retrieve any information required by the system. In still further embodiments, any access module, simulation module, or rendering module operations described herein may be performed by both a server computer and a mobile device, with the place of operation for the distributed modules depending on the availability of processor cycles, memory storage area, network resources, battery power, or other computing resources at the mobile device.

Figure 6:
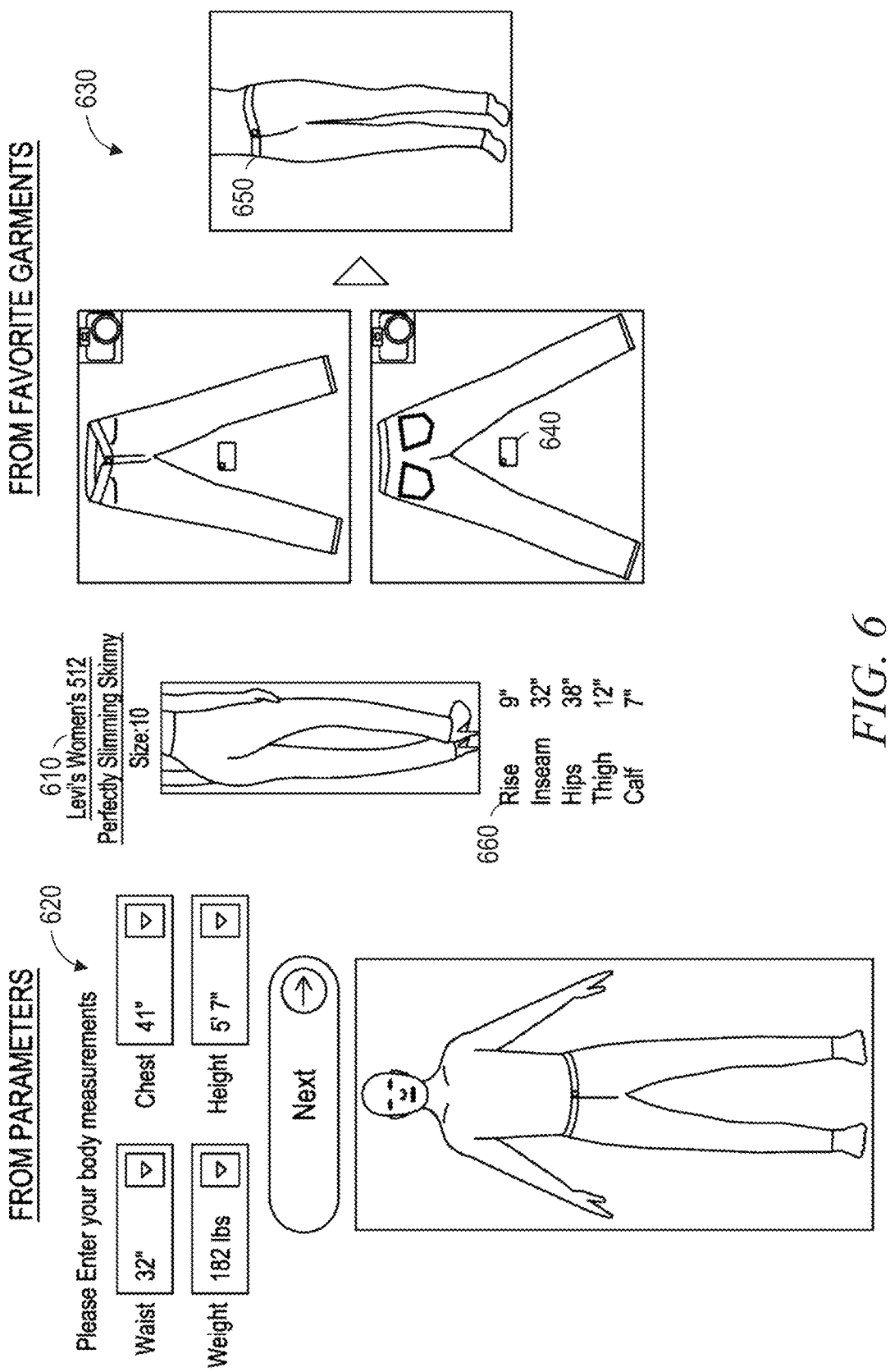
FIG. 6 illustrates an interface for generating a body model for use with virtual contexts in accordance with certain example embodiments.
Figure 7:
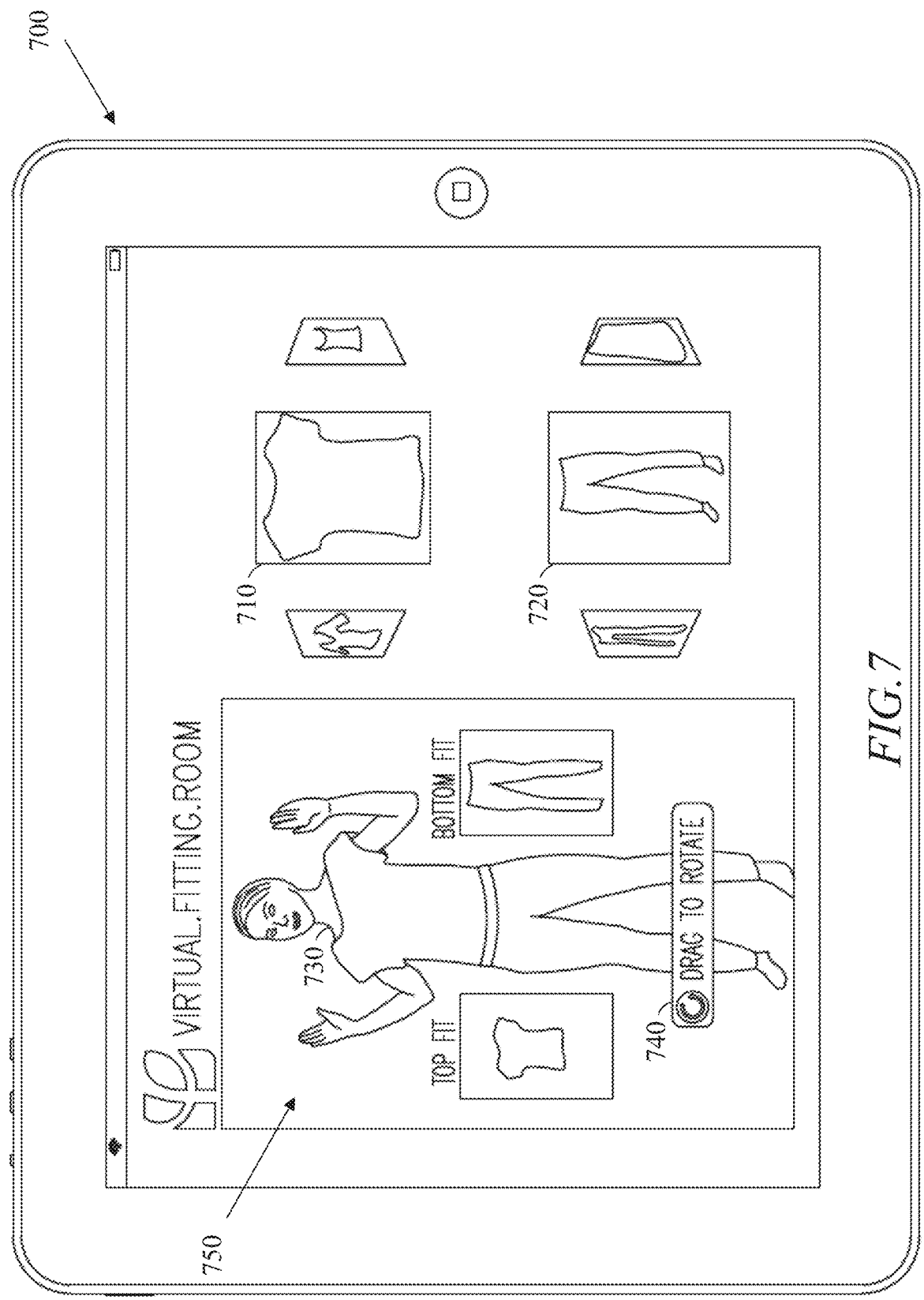
FIG. 7 illustrates aspects of a virtual fitting room that may be used with virtual contexts in accordance with certain example embodiments.
Figure 8:
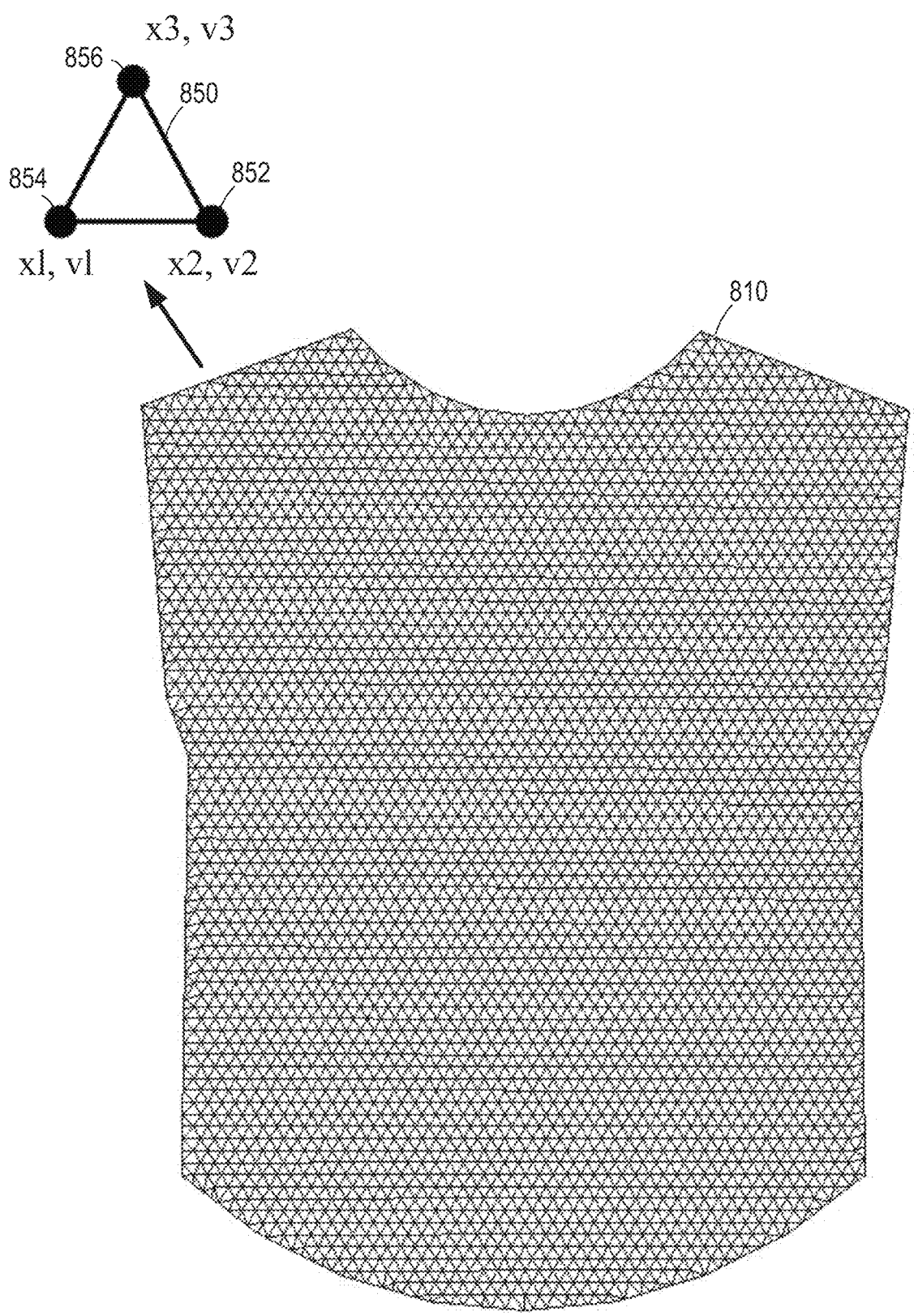
FIG. 8 illustrates aspects of a wearable item model that may be used with virtual contexts in accordance with certain example embodiments.
Figure 9:
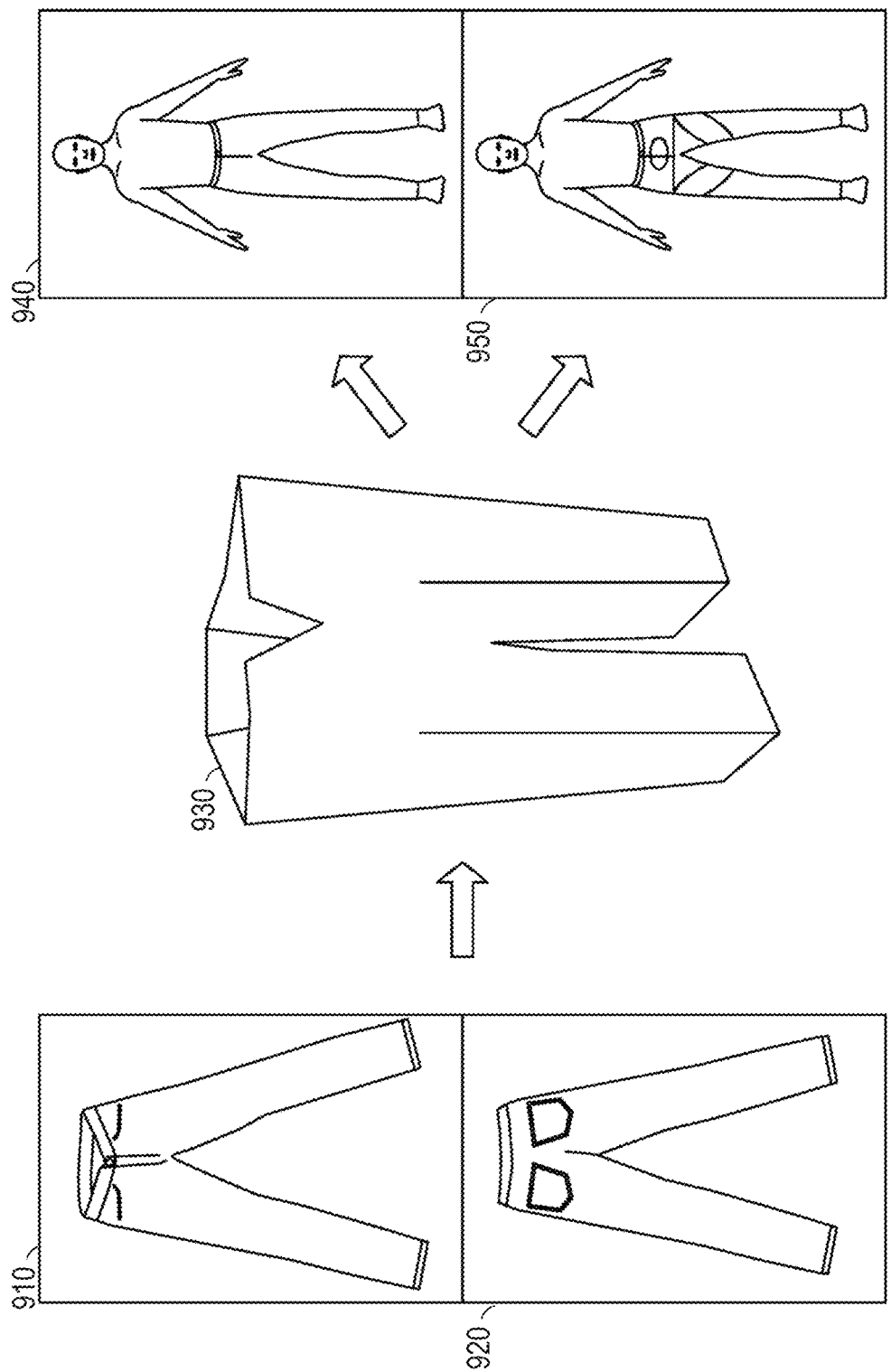
FIG. 9 illustrates aspects of wearable item image generation that may be used with virtual contexts in accordance with certain example embodiments.

As described above, certain embodiments may relate to presentation of wearable items in an interface of a virtual dressing room. This may include accessing size or body model information from a user, as described for operation 555 above. FIG. 6 below details aspects of size or body model information that may be implemented as part of a system. A virtual dressing room may also involve a user selecting garments or other items from a merchant online store as described in operation 558. FIGS. 7-9 detail aspects of garment selection and creation of garment models that may be used to generate wearable item images according to various embodiments. A virtual dressing room may also involve presentation of an item image with a contest and selection of contexts to associate with a selected wearable item as described in operation 560. FIGS. 10A-F illustrate aspects of context selection in an example embodiment.

FIG. 6 illustrates aspects of a system gathering body measurement information that may be used in a body model and further used to identify garment data to select or generate a wearable item image. In some embodiments, the body measurements of the user can be user inputs 620, such as waist, weight, chest, height, or other body measurements. In certain embodiments a garment portion of simulation module 246 can generate different three-dimensional body models based on the body measurements. Such body models may be three dimensional representations of a user or of an abstract person's shape. In certain embodiments, such a body model may comprise CAD data or three dimensional structures representing a body that may be used with garment models. Such body models may then be used with a garment model to generate a three dimension model of a wearable item draped on a user, and this model may be used to render a wearable item image that may be accessed by an access module for use in generating item context images.

In other instances, the body measurements of a user can be received from photographs 630 using a calibration object 640. Calibration can assign an x, y, z position value to each pixel. If the garment is laid out on a planar surface, the system 100 may need the relative position of three points to compute the calibration (or projection mapping from image to object space). For example, using the calibration object 640, the system can extract the four corner points, and given the dimensions of the calibration object 640, the system 100 has enough information to compute the calibration. Based on the calibration, the system 100 can present the garment on an avatar 650 and display properties 660 (e.g., rise measurement, inseam measurement, hips measurement, thigh measurement, calf measurement) associated with the garment. Similarly, with a grid paper as a calibration object, the system can use the relative positions of three points to compute this calibration. Additionally, the body model can be generated based on purchase history and feedback. Feedback can include returns and acceptances of purchases, and the measurements or clothing models associated with kept purchases may be used to automatically generate a body model.

FIG. 7 illustrates the virtual fitting room example shown on a user interface output display of mobile device 700. In the virtual fitting room example, customers can mix and match clothes (e.g., shirts 710 and pants 720) virtually in-store, and digitally try on inventory on body model 730 to generate a wearable item image 750. User interface 740 may be used to generate context images illustrated a wearable item draped on a body model 730. Examples of wearable items include selected wearable items shirt 710 and pants 720 shown on body model 730. Additionally, as shown, in certain embodiments a draped or clothed body model may include multiple wearable item models draped on a single body model, so that a draped body model may be generated from a first wearable item model, a second wearable item model, and a body model. In embodiments where viewpoints are selected to provide maximum display of wearable items while allowing portions of a body model to be occluded, multiple wearable item models may be processed together in determining the number of visible pixels associated with wearable item models. In other embodiments, only pixels associated with selected wearable items may be used in such a calculation, with pixels associated with default clothing not considered. This may occur, for example, which a user is comparing shirt types without consideration of the pants shown on a body model, or if a user is considering a dress without considering the shoes. In certain embodiments, a user may select viewpoints in a context model where certain wearable items, such as shoes, are intentionally obscured to enable a user to compare another wearable item type, such as a dress, without the distraction of non-matching shoes.

In addition to using an interface to accept body model information from a user to generate a body model that may be used to generate a wearable item image, a system may also access information for three-dimensional digital wearable item simulation, according to example embodiments. Such operation may involve determining the size of the garment and an operation for draping the garment on a body model.

In such embodiments an access module such as access module 244 can access, from a database, a three-dimensional garment model of a garment, the three-dimensional garment model including garment points that represent a surface of the garment. The accessed three-dimensional garment model of a garment can be stored in the garment model files of a memory device.

For example, the accessed three-dimensional garment model can be a tessellated three-dimensional garment model. The tessellated three-dimensional garment model can includes a group of vertices associated with points on the surface of the garment. The tessellated 3-D garment model of the garment can be received using the communications interface 220 via the network 34.

The garment points can be generated using a tessellation technique by the tessellation module. Tessellation can tile a garment into many tessellated geometric shapes to generate the tessellated garment with garment points. The tessellated geometric shapes can be stored in the extracted geometry files of a memory device. Optionally, when texture information is obtained, the texture information can be stored in the extracted texture files of a memory device.

For example, as illustrated by shirt 810 of FIG. 8, a shirt can be tessellated with triangles (e.g., about 20,000 triangles when a triangle edge is around 1 centimeter), and the vertices of the triangles can be the garment points of the three-dimensional garment model. The garment points can include location information such as an x, y, and z position value. Additionally, the location information can be independent of the color and design of the garment. Access module 244 can then access a body measurement of a person. In some instances, the access module 244 can access a plurality of body measurements. The body measurement of the person can be received via user input. For example, the body measurement can include neck size, arm length, chest size, waist size, leg length, and so on. The list of parameters for women can include weight, height, bust, waist, and hips. Different female bodies can be generated based on the body parameter. Additionally, different bodies can also be created by interpolating between two bodies of specific measurements. The list of parameters is just representative, and is not intended to be exhaustive. Similarly, in some instances, the list can include a subset of the parameters listed. Simulation module 246 can then generate a three-dimensional body model based on the accessed body measurement.

Once the body measurement has been accessed, the system can create a set of 3-D human-like body models (e.g., static, animated, dynamic) for virtual dressing room. The simulation module 246 can position at least a portion of the generated three-dimensional body model inside the garment points. In some instances, positioning can include placing the garment on or around the body, given that the body may be fixed in some embodiments. In these instances, the garment can be stretch and deformed based on the simulation. The simulation module 246 can configure at least one processor among the one or more processors (e.g., the CPU 222) to position the body model inside the garment model.

By simulating the garment model on each male and female body model, the application can generate a realistic virtual dressing room experience to generate realistic wearable item images from item models. In some instances, simulation of the garment can include placing the garment around the body at an appropriate position, and running simulations based on calculations. The simulation can advance the position and other related variables of the vertices of the garment based on different criteria (e.g., the laws of physics, garment material properties, body-garment interaction). The result is a large system of equations (e.g., one variable for each force component) that the garment simulation module 246 can solve in an iterative fashion. The simulation can be completed when the simulation becomes stable. For example, the simulation can become stable when the garment reaches a steady state with a net force of zero.

In some arrangements, the simulated force can include a gravitational force, an elastic force, a friction force, or an aerodynamic force. Additionally, the garment simulation module can further calculate the one or more simulated forces acting on the subset of the garment points based on the material property of the garment. For example, the simulated one or more forces can include a gravitational force and an elastic force, and the material property of the garment indicates a degree to which the garment is elastic. The material property of the garment can include, but is not limited to, a sheerness value, a linear stiffness value, or a bending stiffness value.

Some examples of implementations and equations are described below. For example, below is the system of equations for a three-spring implementation of a sample triangle 550 with three vertices (i.e., a vertex 852, a vertex 854, and a vertex 856) associated with a tessellated garment model of shirt 810, as illustrated in FIG. 8.

$$spring_{force_1} = \left(\frac{k_s}{restlength_1}\right) * (|x_2 - x_1| - restlength_1) * spring_{direction_1} + \left(\frac{k_d}{restlength_1}\right) * Dot_{Product}(v_2 - v_1, spring_{direction_1}) * spring_{direction_1}$$ (Equation 1)

$$spring_{force_2} = \left(\frac{k_s}{restlength_2}\right) * (|x3 - x2| - restlength_2) * spring_{direction_2} + \left(\frac{k_d}{restlength_2}\right) * Dot_{Product}(v3 - v2, spring_{direction_2}) * spring_{direction_2}$$ (Equation 2)

$$spring_{force_3} = \left(\frac{k_s}{restlength_3}\right) * (|x1 - x3| - restlength_3) * spring_{direction_3} + \left(\frac{k_d}{restlength_3}\right) * Dot_{Product}(v1 - v3, spring_{direction_3}) * spring_{direction_3}$$ (Equation 3)

Where $k_s$ is the elastic spring constant, $k_d$ is the damping spring constant, and each vertex has a position (x) and velocity (v).

In the equations above, when the denominator is a restlength value, a non-zero value can be used for zero-length springs. Additionally, the equations can use a visual restlength value when the denominator is not the restlength value, which in zero-length spring cases is 0. This allows for the system to handle zero-length springs without dividing by 0.

To further explain the equations above, a walkthrough of the equations is described. The state that the simulation module can maintain is the positions and velocities of all the points that represent the garment. As the simulator moves forward in time, the simulator can update the positions of the points over time by computing the net force on each point at each instance in time. Then, based on the mass of the particle, the simulator can use the equation based on the laws of motion, F=ma, to calculate an acceleration. The acceleration determines a change in velocity, which can be used to update the velocity of each point. Likewise, the velocity determines a change in position, which can be used to update the positions. Therefore, at each point in the simulation, the simulator can compute the net force on each particle. The forces exerted on each particle can be based on a gravitational force, spring forces, or other forces (e.g., drag forces to achieve desired styling). The equation for gravitational force is F=mg, and the spring force is described above.

The spring force F has two components, an elastic component (e.g., the part of the equation multiplied by k_s) and a damping component (e.g., the part of the equation multiplied by k_d). The elastic component is related to the oscillation of the spring. The strength of the elastic force is proportional to the amount the spring is stretched from the restlength value, which can be determined by x2−x1 (e.g., the current length of the spring) minus the restlength value. For example, the more the spring is compressed or stretched, the higher the force pushing the spring to return to its rest state. Additionally, k_s is a spring constant that allows for scaling up/down the force based on the strength of the spring, which is then multiplied by the spring direction to give the force a direction (e.g., in the direction of the spring).

The damping component calculates the damping effect (e.g., heat being generated by the spring moving, drag). Damping can be drag force, where the higher the velocity, the higher the drag/damping force. Accordingly, damping can be proportional to velocity. In the case of a spring, there can be two particles moving, so instead of a single velocity the simulator computes a relative velocity between the two endpoints. For example, the larger the relative velocity, the faster the points are moving apart or coming close together, and as a result the larger the damping force (e.g., the damping is proportional to relative velocity). Additionally, k_d is the damping spring constant to scale the damping force up/down, which can be multiplied by the spring direction to give the force a direction.

In various example embodiments, an individual simulation can be run for each of the Nm or Nw bodies. The resultant output can be stored or displayed to a user. In some instances, for each of the bodies, the system can capture the position of the vertices at the end of the simulation, and store the information in a database. For a mesh with K vertices, a total of 3K numbers are stored (the x, y, and z positions for each vertex). These constitute the look of the given garment on any given body.

In various example embodiments, at the steady state of each simulation, the system can also compute the forces being exerted in the springs (e.g., edges) of the mesh. For example, for an edge between two vertices (e.g., V_1 and V_2), the resultant force on V1 (and correspondingly V2) equals:

$$F(V\_1)=k(V\_1,V\_2)*\text{Delta}(V\_1 V\_2) \qquad \text{(Equation 4)}:$$

In Equation 4, k(V_1,V_2) is the spring constant of the spring joining V_1 and V_2 (e.g., a function of the material property of the garment); and Delta(V_1 V_2) is a velocity-dependent force function based on the change in position vectors for V_1,V_2 as compared to their original rest state. These forces can then be then accumulated for each vertex to compute the resultant force.

In various example embodiments, for each of the bodies, the system 100 can store the resultant force on each vertex. The resultant force on each vertex can serve as a measure of the tightness (e.g., for large force magnitude) or looseness in different regions of the garment. The resultant force computed can be interpreted as a stress, pressure, or compression on the garment. This information may be used by a virtual dressing room to generate an accurate wearable item image. Simulation module 246 can then use a wearable item model with a body model to generate a draped or clothed body model which may be integrated as part of a context model.

A display module 250 can then present the generated image on a display of a device. The display module 250 can configure the user interface 232 for the presentation. The display module 250 can configure at least one processor among the one or more processors (e.g., the CPU 222) to present the generated image on the display of a mobile device.

For example, as illustrated in FIG. 9, using the a body model and a wearable item model, a garment simulation module can generate a first partial shape corresponding to the front of a pair of jeans 910 and a second partial shape corresponding to the back of the jeans 920. Then, a digital garment creation module can determine that the received images are images of a pair of jeans by comparing the generated partial shapes to the jeans garment template in the garment template database 255. Moreover, based on the determination that the garment is a pair of jeans, the digital garment creation module can join the partial shapes to generate a 3-D pair of digital jeans 930. The 3-D pair of digital jeans 930 can be tessellated. Furthermore, the access module 244 can receive the tessellated garment model at technology package 104 along with body model information. Simulation module 246 may use this information to generate a model of the garment draped on the body model, and the resulting draped body model may be used in different environment models to generate different context models.

In certain embodiments, simulation module 266 can take as input tessellation and material properties and can output models of wearable items draped on a body model as a wearable item image. Additionally, simulation module 246 may generate models of an environment, and use various modules such as object simulation module 130 to process the environment and generate an environment image with placement volume data. The simulation module 266 can use digitization 110, modeling 120, simulation 130, and automated 1640 techniques to generate a three-dimensional simulation of both wearable items and contexts. These are generated separately because of the massive number of images that would be needed for pre-generation of context images, if every available context was used with every available wearable item. This additionally enables separate generation of wearable item images using body models customized to a particular user. Still further, this enables a modular system where a user may provide their own context data to a system, for example by using a mobile phone camera to take a picture of a scene that may be sent to access module 244 and processed by simulation module 246.

For wearable items, the simulation module 266 can move points around to fit a 3-D body model based on a simulated force (e.g., friction, stitching force). Additionally, based on this modeling, the points are connected via springs and can be stretched based on a simulated force (e.g., gravity, material property of garment). The simulation module 266 can solve a system of equations, given that the equations are all inter-connected. In one example, the system of equations can be based on the spring force on each vertex.

FIGS. 10A-F then illustrate aspects of context integrated with body model and wearable item information as displayed in item context images on an example user interface.

Figure 10A:
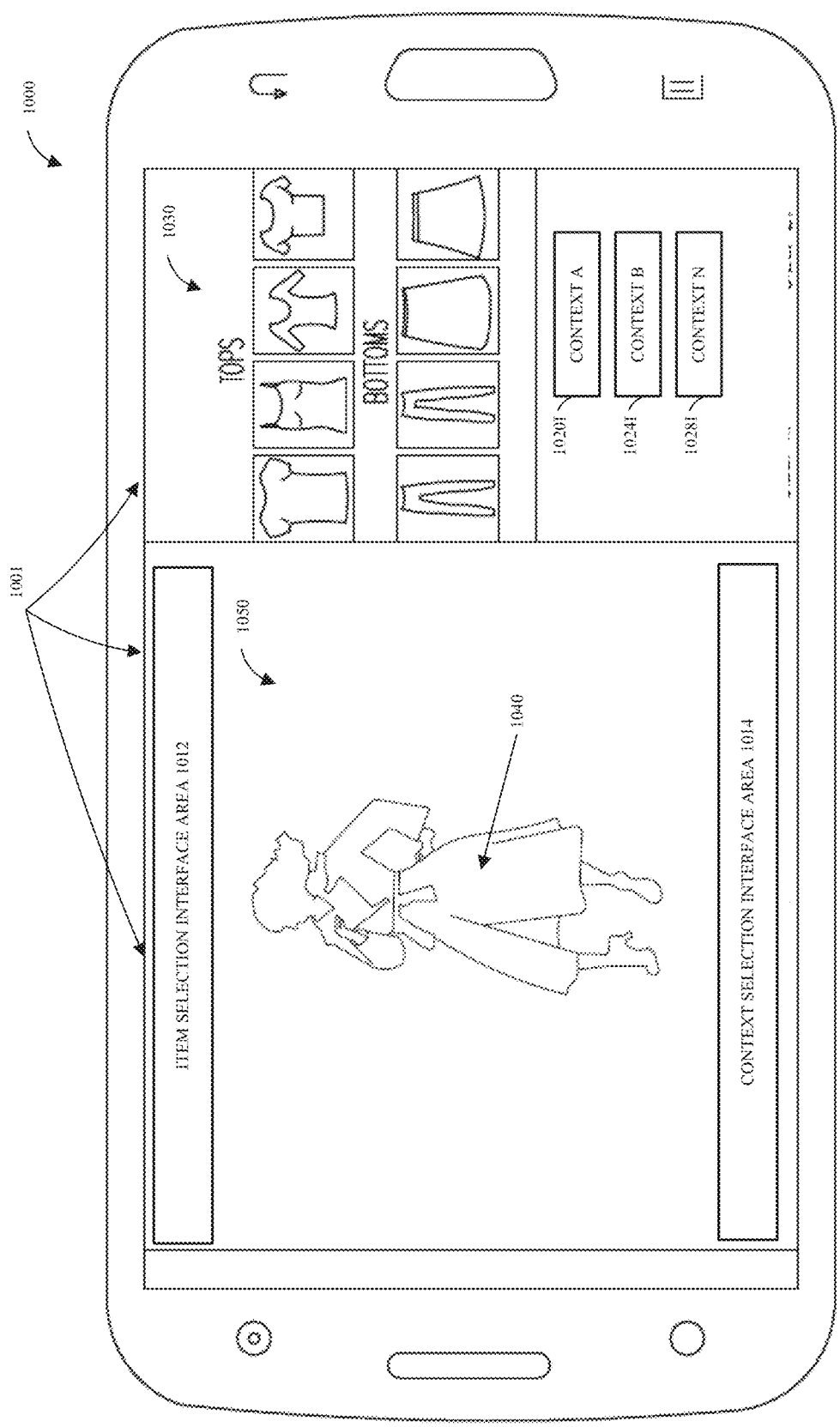
FIG. 10A illustrates aspects of a virtual fitting room that may be used with virtual contexts in accordance with certain example embodiments.

FIG. 10A shows mobile device 1000, which may be similar to device 202, devices 10, computing device 1200, or any other device described herein. Mobile device 1000 includes a touch screen display 1001 which functions both as an output display and a user interface. Touch screen display 1001 displays an image of a plurality of wearable items 1030, which may include an interface for selecting a wearable item as part of a virtual dressing room. In certain embodiments, selection of a wearable item 1030 from touch screen display 1001 may be part of selection of a wearable item discussed above for operation 558.

Touch screen display 1001 also displays selection buttons for a plurality of environments, each associated with a different context. These selection buttons are shown as section button 10201 associated with context a, selection button 10241 associated with context B, and selection button 10281 associated with context N. Virtual dressing room area 1050 outputs a context image based on selections made by a user. In FIG. 10A, virtual dressing room area 1050 shows Wearable item 1040 with no context. In certain embodiment, a central area of virtual dressing room area 1050 may be associated with a user interface that enables a user to pan or rotate the image output in virtual dressing room area 1050. This may particularly be associated with embodiments where three dimensional models are used to generate wearable item images. In such embodiments, item selection interface area 1012 may be an interface used to scroll through item options.

A swiping interaction made across item selection interface area 1012 may be used to select a next wearable item in a queue. When such a user input is received, the device may receive a wearable item image for the newly selected item, and perform the superposition process for generating a context image.

Similarly, context selection interface area 1014 may enable a swiping interface to select a next or previous context from an order list of contexts. Receiving such an input at context selection interface area 1014 of mobile device 1014 may cause mobile device 1014 to access context data including an environment model and pre-generated placement volume information, and to use this context data with the item data for a previously selected item to generate a context image.

Figure 10B:
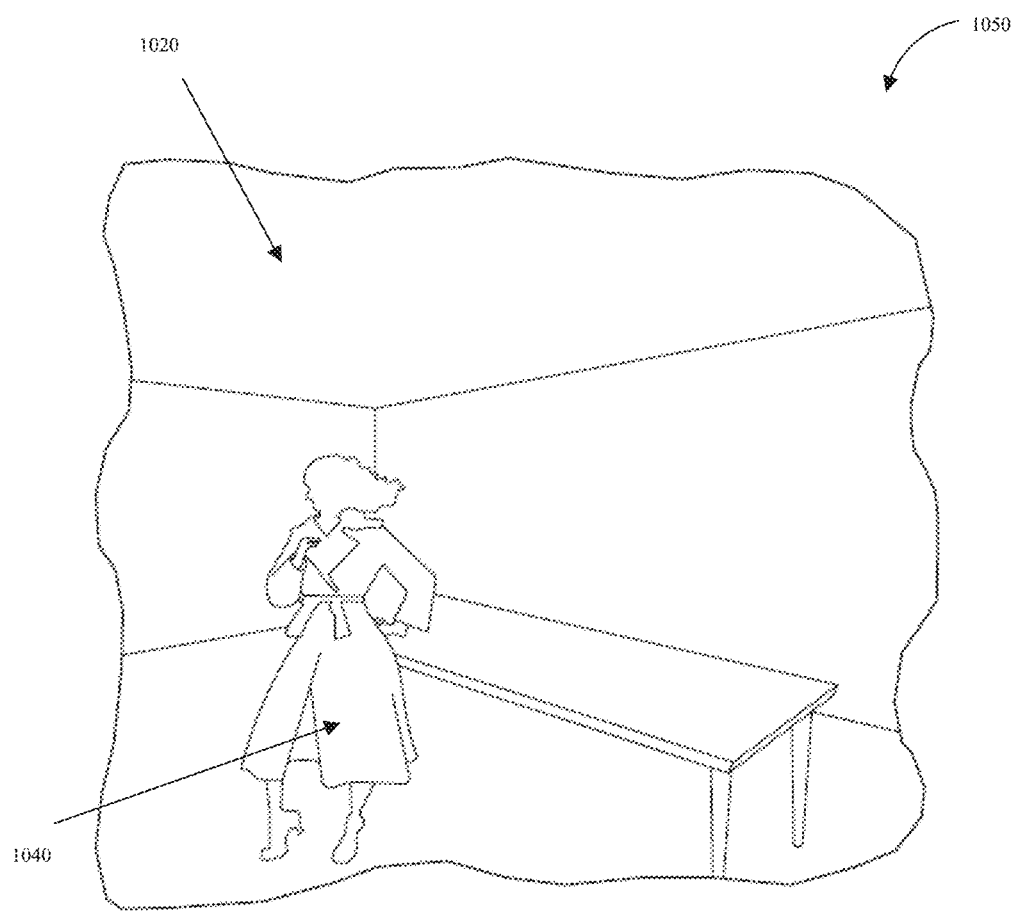
FIG. 10B illustrates aspects of a content image generated with virtual contexts in accordance with certain example embodiments.

FIG. 10B then shows virtual dressing room area 1050 displaying a context image generated using wearable item 1040 and environment 1020 associated with context A. In certain embodiments, as described above, a user input may be used to generate a second context image with the same environment image and wearable item image, but using a different placement volume. In certain embodiments, a user may input a user generated placement volume using an interface of display 1001. This may also be used to generate a new context image based on the user generated placement volume.

Figure 10C:
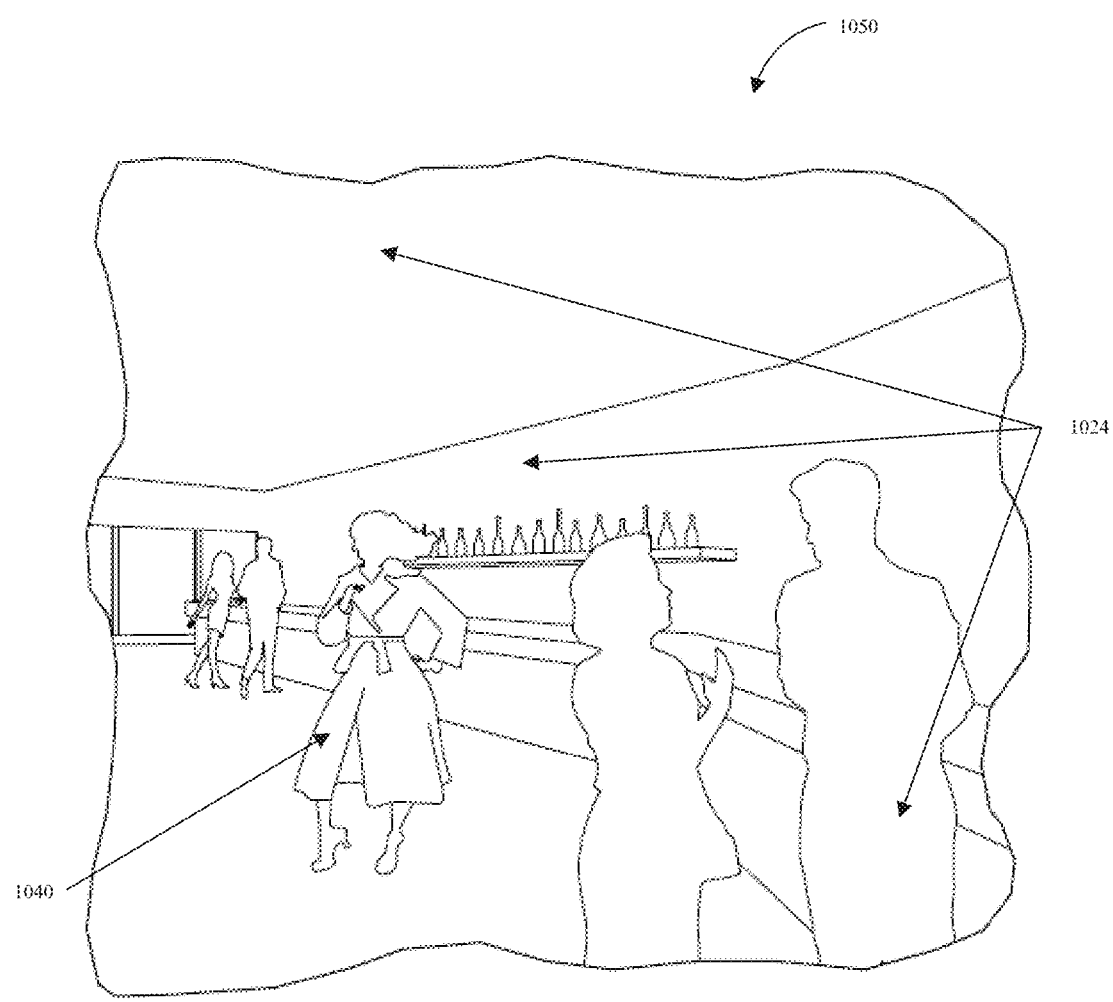
FIG. 10C illustrates aspects of a content image generated with virtual contexts in accordance with certain example embodiments.
Figure 10D:
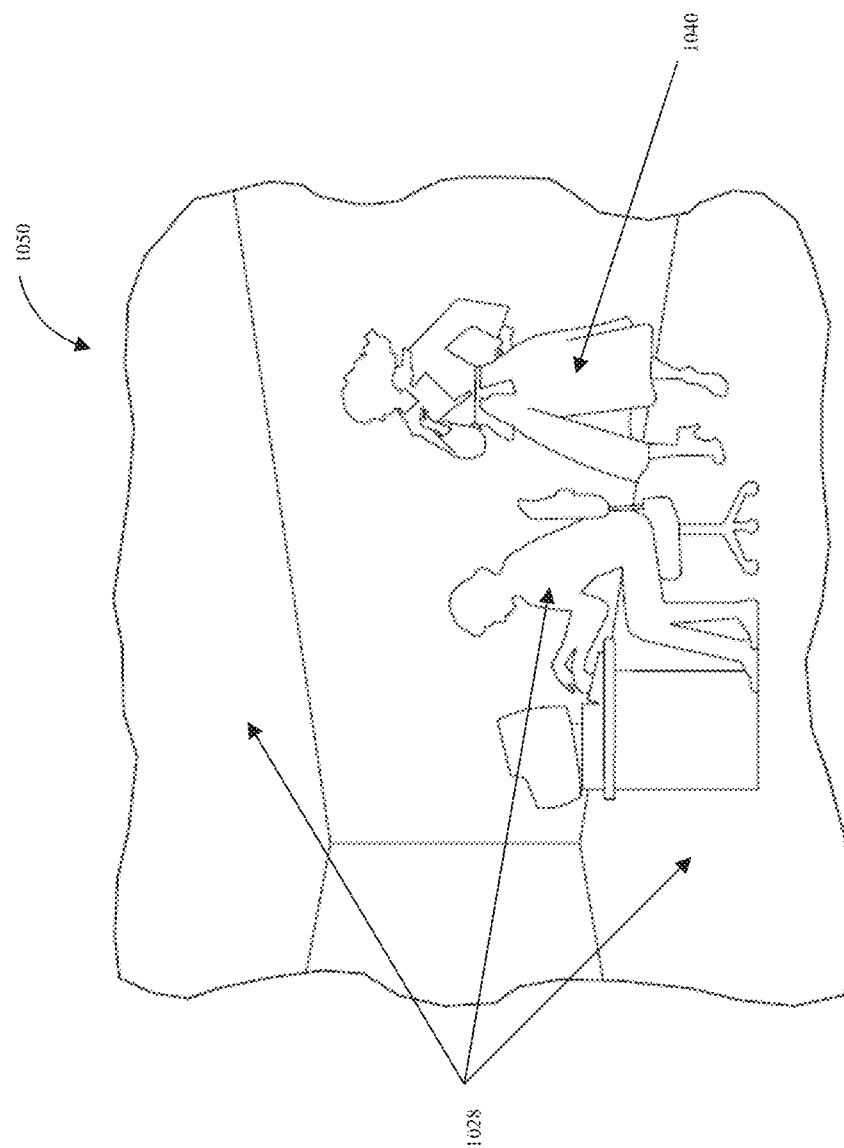
FIG. 10D illustrates aspects of a content image generated with virtual contexts in accordance with certain example embodiments.

FIG. 10C then shows virtual dressing room area 1050 displaying a context image generated from wearable item image 1040 and environment image 1024 associated with context B. FIG. 10D similarly shows virtual dressing room area 1050 displaying a context image generated from wearable item image 1040 and environment image 1028 associated with context N. Such different context images may be generated in response to user selections and described above.

Figure 10E:
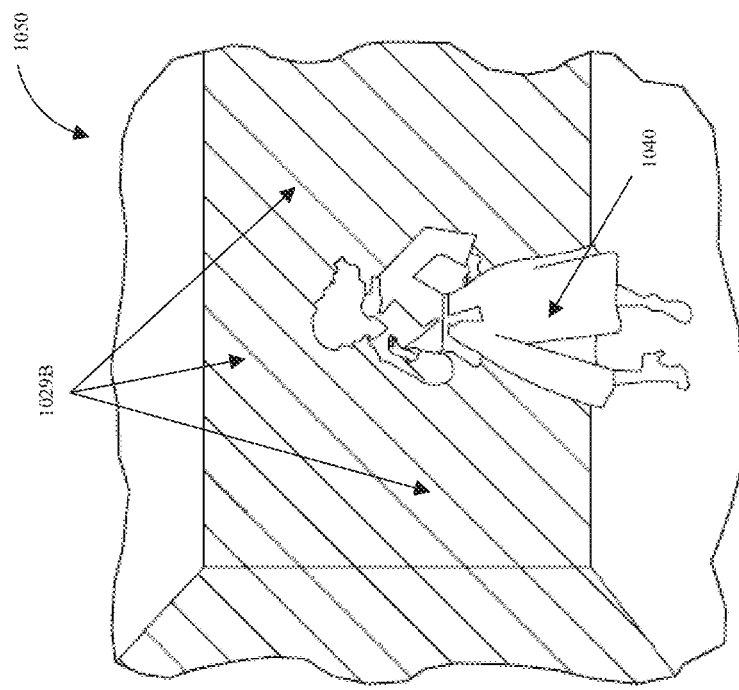
FIG. 10E illustrates aspects of a content image generated with virtual contexts in accordance with certain example embodiments.
Figure 10F:
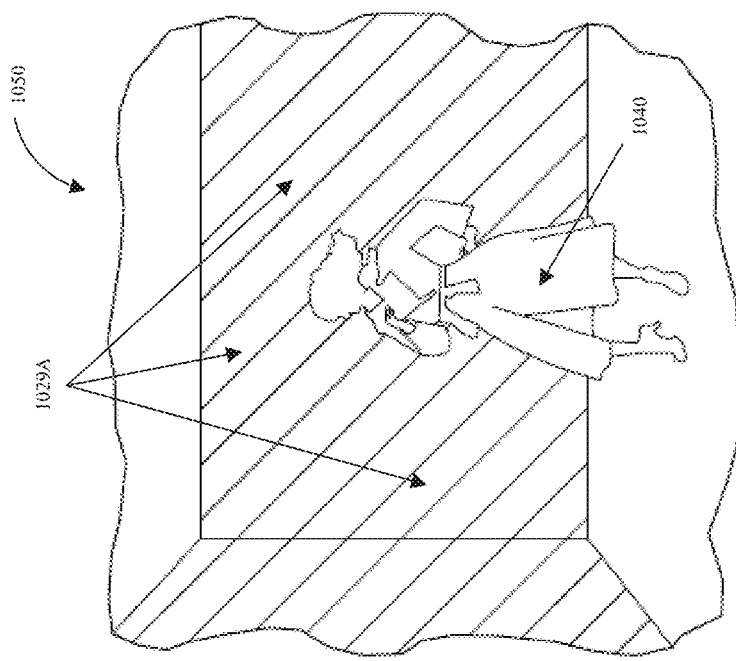
FIG. 10F illustrates aspects of a content image generated with virtual contexts in accordance with certain example embodiments.

Additionally, a user may provide information to generate or modify certain context information. FIGS. 10E and 10F both show a context image generated from wearable item 1040 and the same context model, but in environment image 1029A, a first wall of the environment model has a first color and in environment image 1029B, the same wall of the environment model has a second color different from the first color. A user input may thus be used to adjust a context image by adjusting characteristics of a context model such as colors of various surfaces in the context model.

In various embodiments, the modules described herein may be stored in memory 236 in the computing device 202, as initially described in FIG. 1. Additional files and modules may be included in various embodiments for use in generating context images for output on a device. A file system 242 may include one or more of the following files: garment model files; extracted geometry files; extracted texture files; stitching information files; a garment template database; draping parameters files; simulation parameters files; and simulation result geometry files. Additional such modules may include a boundary extraction module; a texture mapping module; a tessellation module; a stitching module; a draping module; and a simulation module, all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Each of the above identified elements may be stored in one or more of the previously mentioned memory devices, and corresponds to a set of instructions for performing a function described above. The above identified modules or programs (e.g., sets of instructions) need not be implemented as separate software programs, procedures, or modules, and thus various subsets of these modules may be combined or otherwise rearranged in various example embodiments. In some example embodiments, the memory 236 may store a subset of the modules and data structures identified above. Furthermore, the memory 236 may store additional modules and data structures not described above.

The actual number of servers used to implement the simulation module 246 and how features are allocated among them will vary from one implementation to another, and may depend in part on the amount of data traffic that the system 100 handles during peak usage periods as well as during average usage periods.

Figure 11:
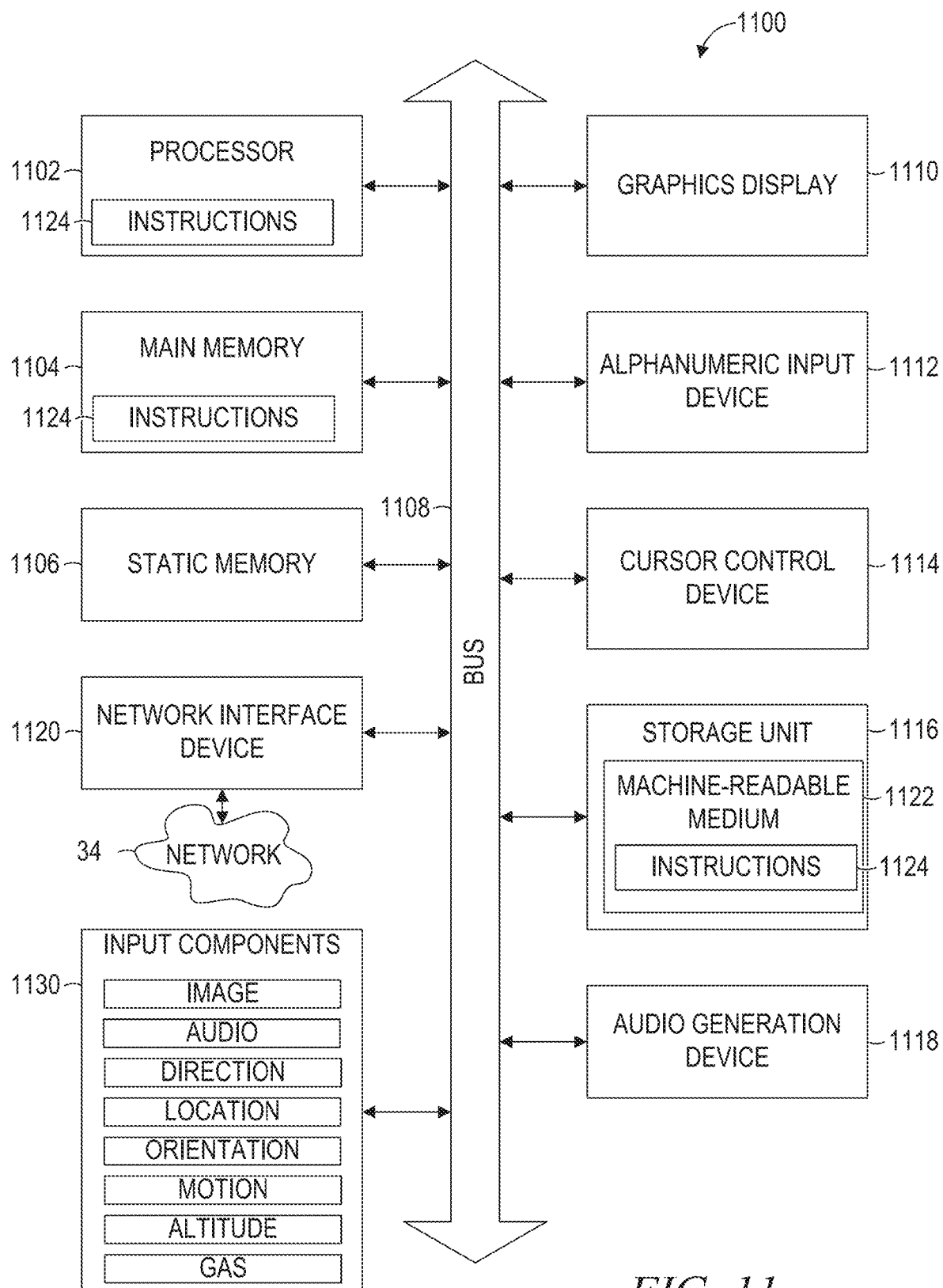
FIG. 11 is a block diagram illustrating components of a computing device, according to some example embodiments, able to read instructions from a machine-readable medium and perform any one or more of the methodologies discussed herein.

FIG. 11 is a block diagram illustrating components of a computing device 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the computing device 1100 in the example form of a computer system (e.g., a computer) within which the instructions 1124 (e.g., software, a program, an application, an applet, an app, or other executable code) for causing the computing device 1100 to perform any one or more of the methodologies discussed herein may be executed, in whole or in part. The computing device 202, merchant server system 502, and client device 510 may all be implemented using at least one computing device 1100, or different elements of computing device 1100 described below.

In alternative embodiments, the computing device 1100 operates as a standalone device or may be connected (e.g., networked) to other machines. In a networked deployment, the computing device 1100 may operate in the capacity of a server machine or a client machine in a server-client network environment, or as a peer machine in a distributed (e.g., peer-to-peer) network environment. The computing device 1100 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The computing device 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The computing device 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The computing device 1100 may also include an alphanumeric input device 1112 (e.g., a keyboard or keypad), a cursor control device 1114 (e.g., a mouse, a touchpad, a trackball, a joystick, a motion sensor, an eye tracking device, or other pointing instrument), a storage unit 1116, an audio generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the processor 1102 (e.g., within the processor's cache memory), or both, before or during execution thereof by the computing device 1100. Accordingly, the main memory 1104 and the processor 1102 may be considered machine-readable media (e.g., tangible and non-transitory machine-readable media). The instructions 1124 may be transmitted or received over the network 34 via the network interface device 1120. For example, the network interface device 1120 may communicate the instructions 1124 using any one or more transfer protocols (e.g., hypertext transfer protocol (HTTP)).

The machine-readable medium 1122 may include a magnetic or optical disk storage device, solid state storage devices such as flash memory, or other non-volatile memory device or devices. The computer-readable instructions stored on the computer-readable storage medium are in source code, assembly language code, object code, or another instruction format that is interpreted by one or more processors.

In some example embodiments, the computing device 1100 may be a portable computing device, such as a smartphone or tablet computer, and have one or more additional input components 1130 (e.g., sensors or gauges). Examples of such input components 1130 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein. In certain embodiments, input components 1130 may be used to generate context data including environment images, and wearable item data such as raw wearable item images. Raw wearable item images may be processed with a body model to generate a wearable item image usable by the system by, for example, eliminating background information from the raw wearable item image.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store the instructions 1124. The term "machine-readable medium" shall also be taken to include any medium, or combination of multiple media, that is capable of storing the instructions 1124 for execution by the computing device 1100, such that the instructions 1124, when executed by one or more processors of the computing device 1100 (e.g., the processor 1102), cause the computing device 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

The foregoing description, for purposes of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   one or more processors; and
   a computer-readable storage medium having instructions stored thereon that are executable by the one or more processors to perform operations comprising:
   accessing a three-dimensional model of an item, the three-dimensional model of the item comprising item points that represent a surface of the item;
   determining a placement volume for the three-dimensional model of the item within a digital environment, the placement volume being positioned at an unobstructed portion of a ground area in the digital environment;
   determining a visual perspective for the placement volume within the digital environment based on one or more objects that obstruct a view of the item points, the visual perspective specifying a viewpoint from which the view of the item points is observed in the digital environment;
   positioning the three-dimensional model of the item in the digital environment at the unobstructed portion of the ground area using the placement volume and the visual perspective for the placement volume; and
   outputting a display of the digital environment including the positioned three-dimensional model of the item according to the placement volume and the visual perspective for the placement volume.

2. The system of claim 1, wherein accessing the three-dimensional model of the item is performed responsive to receiving user input selecting the item via a virtual marketplace.

3. The system of claim 1, the operations further comprising generating the digital environment using a plurality of two-dimensional images of a physical environment.

4. The system of claim 1, the operations further comprising generating the three-dimensional model of the item using a plurality of two-dimensional images of the item.

5. The system of claim 1, the operations further comprising generating a three-dimensional model of an object on which the item is to be placed and positioning the three-dimensional model of the object relative to the three-dimensional model of the item, wherein outputting the display of the environment includes the three-dimensional model of the item positioned relative to the three-dimensional model of the object.

6. The system of claim 5, wherein the object is a human body, the operations further comprising prompting a user of the system for input describing body measurements and generating the three-dimensional model of the object based on the body measurements.

7. The system of claim 5, wherein positioning the three-dimensional model of the object relative to the three-dimensional model of the item comprises calculating at least one simulated force acting on the item points based on the positioning of the three-dimensional model of the object relative to the three-dimensional model of the item.

8. The system of claim 7, wherein the at least one simulated force models an impact of wind on the item as positioned on the three-dimensional model of the object.

9. The system of claim 7, the operations further comprising determining material characteristics of the item, wherein the at least one simulated force models an impact of material characteristics of the item as positioned on the three-dimensional model of the object.

10. A system comprising:
    one or more processors; and
    a computer-readable storage medium having instructions stored thereon that are executable by the one or more processors to perform operations comprising:
    generating a three-dimensional model of an item using a plurality of two-dimensional images of the item, the three-dimensional model comprising a plurality of item points representing a surface of the item;
    determining a placement volume for the three-dimensional model of the item within a digital environment based on the plurality of item points and being positioned at an unobstructed portion of a ground area in the digital environment;
    determining a visual perspective for the placement volume within a digital environment based on one or more objects that obstruct a view of the item points when observed in the digital environment from a viewpoint;

positioning the item in the digital environment at the unobstructed portion of the ground area using the placement volume and the visual perspective for the placement volume; and outputting a display of the digital environment including the positioned three-dimensional model of the item.

11. The system of claim 10, wherein the viewpoint is an angle at which the item is observed via the display of the digital environment and determining the visual perspective for the placement volume is further performed based on at least one of a lighting value for the digital environment, a shadow value for the digital environment, or an indication of a physical environment to be represented as the digital environment.

12. The system of claim 10, the operations further comprising receiving input selecting a three-dimensional model of a different item and updating the digital environment by positioning the three-dimensional model of the item relative to the three-dimensional model of the different item in the digital environment.

13. The system of claim 10, the operations further comprising determining a three-dimensional model of an object on which the item is to be placed and positioning the three-dimensional model of the object relative to the three-dimensional model of the item, wherein outputting the display of the digital environment includes the three-dimensional model of the item positioned relative to the three-dimensional model of the object.

14. The system of claim 13, the operations further comprising receiving an image of a user and determining the three-dimensional model of the object based on the image of the user.

15. The system of claim 13, wherein positioning the three-dimensional model of the item relative to the three-dimensional model of the object comprises calculating at least one simulated force acting on the plurality of item points based on the positioning of the three-dimensional model of the object relative to the three-dimensional model of the item, wherein the display of the digital environment includes a display of the at least one simulated force acting on the item.

16. The system of claim 13, wherein the object is a human body and determining the three-dimensional model of the object comprises receiving measurements describing one or more of a height of a user, a weight of the user, a waist size of the user, a chest size of the user, a neck size of the user, an arm length of the user, a leg length of the user, a thigh size of the user, a calf size of the user, a rise measurement for the item, or an inseam measurement for the item.

17. The system of claim 16, wherein receiving the measurements is performed in response to accessing information describing a purchase history and purchase feedback for a user of the system.

18. A method comprising:
accessing, by a computing device, a three-dimensional model of an item, the three-dimensional model of the item comprising item points that represent a surface of the item;

determining, by the computing device, a placement volume for the three-dimensional model of the item within a digital environment, the placement volume being positioned at an unobstructed portion of a ground area in the digital environment;

determining, by the computing device, a visual perspective for the placement volume within the digital environment based on one or more objects that obstruct a view of at least one of the item points, the visual perspective specifying a viewpoint from which the view of the item points is observed via a display of the digital environment;

positioning, by the computing device, the three-dimensional model of the item in the digital environment at the unobstructed portion of the ground area using the placement volume and the visual perspective for the placement volume; and outputting, by the computing device, the display of the digital environment including the positioned three-dimensional model of the item.

19. The system of claim 1, wherein the determining of the placement volume is performed independent of user input.

20. The system of claim 10, wherein the determining of the placement volume is performed independent of user input.

* * * * *